(12) United States Patent
Hwang et al.

(10) Patent No.: US 8,228,770 B2
(45) Date of Patent: Jul. 24, 2012

(54) OPTICAL RECORDING MEDIUM, RECORDING/REPRODUCING APPARATUS, AND RECORDING/REPRODUCING METHOD

(75) Inventors: Sung-hee Hwang, Seoul (KR); Jung-wan Ko, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 57 days.

(21) Appl. No.: 12/052,224

(22) Filed: Mar. 20, 2008

(65) Prior Publication Data

US 2008/0165636 A1   Jul. 10, 2008

Related U.S. Application Data

(63) Continuation of application No. 11/029,356, filed on Jan. 6, 2005.

(30) Foreign Application Priority Data

Jan. 31, 2004  (KR) .................................. 2004-6473
Mar. 4, 2004   (KR) ................................ 2004-14591
Jun. 3, 2004   (KR) ................................ 2004-40479

(51) Int. Cl.
*G11B 7/00* (2006.01)

(52) U.S. Cl. ................ 369/53.17; 369/47.14; 369/53.15

(58) Field of Classification Search ................ 369/53.17
See application file for complete search history.

(56) References Cited

U.S. PATENT DOCUMENTS

| | | | |
|---|---|---|---|
| 5,068,842 A * | 11/1991 | Naito | 369/47.14 |
| 5,867,475 A | 2/1999 | Moriya et al. | |
| 6,160,778 A | 12/2000 | Ito et al. | |
| 6,292,445 B1 | 9/2001 | Ito et al. | |
| 6,295,257 B1 | 9/2001 | Ito et al. | |
| 6,304,534 B1 | 10/2001 | Ito et al. | |
| 6,367,038 B1 * | 4/2002 | Ko | 369/53.16 |
| 6,542,450 B1 | 4/2003 | Park | |
| 7,020,056 B2 * | 3/2006 | Lee | 369/47.14 |
| 2001/0043525 A1 | 11/2001 | Ito et al. | |
| 2002/0150010 A1 | 10/2002 | Takahashi | |
| 2008/0062830 A1 | 3/2008 | Park | |
| 2009/0262617 A1 | 10/2009 | Al | |

(Continued)

FOREIGN PATENT DOCUMENTS

EP   1 043 723   10/2000

(Continued)

OTHER PUBLICATIONS

ECMA: Standardizing Information and Communication Systems: "Standard ECMA-272: 120mm DVD Rewritable Disk (DVD_RAM)" Standard ECMA, No. 272. Feb. 1998, pp. 43-51, XP002114221.

(Continued)

*Primary Examiner* — Wayne Young
*Assistant Examiner* — Parul Gupta
(74) *Attorney, Agent, or Firm* — NSIP Law

(57) ABSTRACT

An information recording medium, on which when a spare area for a replacement block for replacing a defect block created in a predetermined area of an information recording medium is enlarged or newly allocated, defect status information of blocks within the enlarged or newly allocated spare area is changed and written on the information recording medium. By managing the defect status information of the blocks within the enlarged or newly allocated spare area, unnecessary operations of a drive system are eliminated thus improving efficiency of the drive system.

4 Claims, 21 Drawing Sheets

U.S. PATENT DOCUMENTS

2009/0286515 A1 11/2009 Othmer

FOREIGN PATENT DOCUMENTS

| | | |
|---|---|---|
| EP | 1 260 981 | 11/2002 |
| JP | 07-182792 | 7/1995 |
| JP | 8-55343 | 2/1996 |
| JP | 2000-215612 | 8/2000 |
| JP | 2000-298954 | 10/2000 |
| JP | 2000-322835 | 11/2000 |
| JP | 2002-184041 | 6/2002 |
| JP | 2002-312950 | 10/2002 |
| TW | 292385 | 12/1996 |
| TW | 556163 | 10/2003 |
| WO | WO 00/07185 | 2/2000 |
| WO | WO 2005/109432 | 11/2005 |

OTHER PUBLICATIONS

Austrian Search Report issued in Singapore Patent Application No. 200500143-3 on Mar. 16, 2006.

U.S. Appl. No. 11/029,356, filed Jan. 6, 2005, Sung-hee Hwang, Samsung Electronics Co., :Ltd.

U.S. Appl. No. 12/052,209, filed Mar. 20, 2008, Sung-hee Hwang, Samsung Electronics Co., :Ltd.

U.S. Appl. No. 12/052,237, filed Mar. 20, 2008, Sung-hee Hwang, Samsung Electronics Co., :Ltd.

U.S. Appl. No. 12/052,252, filed Mar. 20, 2008, Sung-hee Hwang, Samsung Electronics Co., :Ltd.

U.S. Appl. No. 12/052,260, filed Mar. 20, 2008, Sung-hee Hwang Samsung Electronics Co., :Ltd.

Preliminary Notice of the First Office Action dated Sep. 30, 2008 of the Taiwanese Patent Application No. 94101269.

Japanese Office Action issued on Jan. 5, 2010, in corresponding Japanese Apllication No. 2005-021974(2 pages).

European Search Report issued on Jun. 10, 2005, in counterpart European Application No. 05 25 0386 (4 pages).

Japanese Office Action issued on Sep. 28, 2010, in corresponding Japanese Application No. 2005-021974 (2 pages).

* cited by examiner

FIG. 11A

DEFECT LIST ENTRY BEFORE ENLARGING OR NEWLY ALLOCATING SPARE AREA

| STATUS INFORMATION | PHYSICAL ADDRESS OF DEFECT BLOCK | PHYSICAL ADDRESS OF REPLACEMENT BLOCK |
|---|---|---|
| 1 | 0010000h ① | 0100000h ② |
| 2 | 0010100h ③ | . |
| 3 | 0010110h ④ | . |

FIG. 11B

DEFECT LIST ENTRY AFTER ENLARGING OR NEWLY ALLOCATING SPARE AREA

| STATUS INFORMATION | PHYSICAL ADDRESS OF DEFECT BLOCK | PHYSICAL ADDRESS OF REPLACEMENT BLOCK |
|---|---|---|
| 4 | . | 0010110h |
| 5 | . | 0010000h |
| 5 | . | 0010100h |
| 5 | . | 0100000h |

FIG. 17A

DEFECT LIST ENTRY BEFORE ENLARGING OR NEWLY ALLOCATING SPARE AREA

| STATUS INFORMATION | PHYSICAL ADDRESS OF DEFECT BLOCK | PHYSICAL ADDRESS OF REPLACEMENT BLOCK |
|---|---|---|
| 1 | 0010000h ① | 0100000h ② |
| 2 | 0010100h ③ | . |
| 3 | 0010110h ④ | . |

FIG. 17B

DEFECT LIST ENTRY AFTER ENLARGING OR NEWLY ALLOCATING SPARE AREA

| STATUS INFORMATION | PHYSICAL ADDRESS OF DEFECT BLOCK | PHYSICAL ADDRESS OF REPLACEMENT BLOCK |
|---|---|---|
| 4 | . | 0010110h |
| 5 | . | 0010000h |
| 5 | . | 0010100h |
| 4 | . | 0100000h |

ALLOCATE SPARE AREA # 2

FIG. 22

| BEFORE ENLARGING OR NEWLY ALLOCATING SPARE AREA | AFTER ENLARGING OR NEWLY ALLOCATING SPARE AREA WHILE USING DISC | |
|---|---|---|
| | WHEN IN USER DATA AREA | WHEN IN SPARE AREA |
| DEFECT BLOCK OF DEFECT LIST ENTRY HAVING REPLACEMENT BLOCK | MAINTAIN IN CURRENT STATE | CHANGE TO AND REGISTER AS DEFECT LIST ENTRY INDICATING USABLE REPLACEMENT BLOCK |
| REPLACEMENT BLOCK OF DEFECT LIST ENTRY HAVING REPLACEMENT BLOCK | SUCH SITUATION DOES NOT OCCUR BY ENLARGING OR NEWLY ALLOCATING SPARE AREA | 1) WHEN CORRESPONDING DEFECT BLOCK IS IN SPARE AREA AFTER ENLARGING OR NEWLY ALLOCATING SPARE AREA, CHANGE TO AND REGISTER AS DEFECT LIST ENTRY INDICATING USABLE REPLACEMENT BLOCK 2) WHEN CORRESPONDING DEFECT BLOCK IS IN USER DATA AREA AFTER ENLARGING OR NEWLY ALLOCATING SPARE AREA, MAINTAIN IN SAME STATE AS BEFORE ENLARGING OR NEWLY ALLOCATING NEW SPARE AREA |
| DEFECT BLOCK OF DEFECT LIST ENTRY WITHOUT REPLACEMENT BLOCK | MAINTAIN IN CURRENT STATE | CHANGE TO AND REGISTER AS DEFECT LIST ENTRY INDICATING UNUSABLE REPLACEMENT BLOCK |
| DEFECT BLOCK OF DEFECT LIST ENTRY WITH POSSIBLE DEFECT | MAINTAIN IN CURRENT STATE | CHANGE TO AND REGISTER AS DEFECT LIST ENTRY INDICATING USABLE REPLACEMENT BLOCK |

OPTICAL RECORDING MEDIUM, RECORDING/REPRODUCING APPARATUS, AND RECORDING/REPRODUCING METHOD

CROSS-REFERENCE TO RELATED APPLICATIONS

This application is a continuation of application Ser. No. 11/029,356 filed on Jan. 6, 2005, currently pending, which claims the benefit of Korean Patent Application Nos. 2004-6473 filed on Jan. 31, 2004, 2004-14591 filed on Mar. 4, 2004, and 2004-40479 filed on Jun. 3, 2004, in the Korean Intellectual Property Office, the disclosures of which are incorporated herein by reference.

BACKGROUND OF THE INVENTION

1. Field of the Invention

The present invention relates to an optical recording medium, a recording and/or reproducing apparatus, and a recording and/or reproducing method.

2. Description of the Related Art

To manage a defect on a recordable disc operating according to a digital versatile disc (DVD) standard, a slipping replacement method is used when the defect occurs while initializing a disc, and a defect sector location replaced by slipping replacement is recorded in a primary defect list (PDL) of a defect managing area of the disc without allocating it a logical sector number. Also, in a linear replacement method, a defect is replaced with a normal block in a spare area in units of error correcting code blocks of an area where an error occurred when the defect occurs while using the disc and a defect block location is recorded in a secondary defect list (SDL).

Such a spare area can be allocated when initializing the disc and additional spare areas may be allocated while using the disc.

Defect management is performed to improve reliability of reproduction of user data recorded on a disc. That is, when a defect has occurred or it is determined that there is a high possibility of an occurrence of a defect while recording or reproducing the disc, the defect is replaced with the spare area to improve reliability of the reproduction.

A defect list entry used in the linear replacement method is typically divided into status information, a physical address of a defect block, and a physical address of a replacement block.

The status information includes status information of a defect block with a replacement block, and status information of a defect block without a replacement block.

The physical address of the defect block is limited to an address of a user data area within a disc so that it can be easily checked in a reproducing process. That is, a host can find data recorded within the user data area of the disc using a file system recorded on the disc, and with this as a basis, the host can reproduce the user data recorded on the disc. When the host tries to find a file system recorded on a disc or tries to reproduce user data, it sends a request to reproduce data using a logic address to a drive system. Then the drive system reproduces data in the physical address corresponding to the logic address and transmits it to the host. Here, if a defect block exists in the physical address corresponding to the logical address, the drive system will reproduce a replacement block as a replacement for the defect block from a defect list entry within a defect list. Accordingly, as the defect management is used for improving reproducing reliability of the user data recorded within the user data area, the physical address of the defect block of the defect list entry may be limited to the address of the user data area of the disc.

Accordingly, it is not preferable that a defect list entry in blocks within the enlarged or newly allocated spare area be left untouched without any management. This is because if the defect list entry on blocks within the newly allocated or enlarged spare area is left as is without any changes, the defect list entry gets an address of the spare area and not an address of the user data area.

In addition, in a medium where defects are managed by indicating whether each block within a spare area can be used as a replacement in a defect list entry, it is not preferable that the defect list entry within the further enlarged or newly allocated spare area be left unchanged. Furthermore, leaving the defect list entry as is causes confusion when a drive system reads the defect list, thus lowering the performance of the drive system.

SUMMARY OF THE INVENTION

According to an aspect of the present invention, there is provided an optical recording medium whereon information on defect status on blocks can be managed within a newly allocated or enlarged spare area for substituting a defect block in the medium, a recording and/or reproducing apparatus, and a recording and/or reproducing method.

According to an aspect of the present invention, there is provided an information recording medium whereon status information of blocks in an enlarged or newly allocated spare area is changed when a spare area for a replacement block for replacing a defect block occurred in a predetermined area of the information recording medium is enlarged or newly allocated while using the medium.

According to an aspect of the present invention, when the status information of the blocks in the enlarged or newly allocated spare area indicates a defect block with a replacement block, a defect list entry including status information indicating that the replacement block and the defect block are unusable replacement blocks may be recorded on the information recording medium. In this case, the defect block may be recorded as a defect list entry including status information indicating that it is an unusable replacement block, and the replacement block may be recorded as a defect list entry indicating that it is a usable replacement block.

According to an aspect of the present invention, when the status information of the blocks in the enlarged or newly allocated spare area indicates a defect block without a replacement block, a defect list entry including status information indicating that the defect block is a usable replacement block may be recorded on the information recording medium.

According to an aspect of the present invention, when the status information of the blocks in the enlarged or newly allocated spare area indicates a possible defective block, if a certification result of the blocks indicates that there is a defect in the possible defective block, a defect list entry including status information indicating that the possible defective block is an unusable replacement block may be recorded on the information recording medium, and if a certification result of the blocks indicates that there is no defect in the possible defective block, a defect list entry including status information indicating that the possible defective block is a usable replacement block may be recorded on the information recording medium.

According to an aspect of the present invention, when the status information of the blocks in the enlarged or newly allocated spare area indicates a possible defective block, a defect list entry including status information indicating that the possible defective block is an unusable replacement block or a defect list entry including status information indicating that the possible defective block is a usable replacement block may be recorded on the information recording medium according to a selection of a drive manufacturer or a user.

According to an aspect of the present invention, when the status information of the block in the enlarged or newly allocated spare area is not recorded on the medium, a defect list entry including status information indicating that the block is a usable replacement block may be recorded on the medium.

Here, the status information is included in a defect list recorded on a predetermined area of the medium, and the defect list includes a defect list header that includes general information of a defect and a defect list entry that includes detailed information of the defect. The information recording medium includes at least one of the information on the number of defect blocks with a replacement block, the number of defect blocks, the number of usable spare blocks, the number of unusable spare blocks, and/or the number of possible defective blocks. The defect list entry includes status information that indicates a defect status or usable status of blocks, information on a physical address of a defect block, and information on a physical address of a replacement block. The status information includes status of a defect block with a replacement block, a status of a defect block without a replacement block, a status of a usable block of a spare area, a status of an unusable block of a spare area, and a status of a possible defective block.

According to another aspect of the present invention, there is provided a write-once recording medium whereon status information of the blocks in an enlarged or newly allocated spare area is changed when a spare area for a replacement block for replacing a defect block in a predetermined area of the medium is enlarged or newly allocated while using the medium.

According to an aspect of the present invention, when the blocks in the enlarged or newly allocated spare area has been already used, a defect list entry having status information indicating that the used block is an unusable replacement block may be recorded on the medium.

According to an aspect of the present invention, when the block in the enlarged or newly allocated spare area has not yet been used and status information of the bocks are not yet written on the medium, a defect list entry having status information indicating that the unused block is a usable replacement block may be recorded on the medium.

According to another aspect of the present invention, there is provided a computer readable recording medium having recorded thereon a program performing a method of recording and/or reproducing data on/from an information recording medium written thereon. The recording and/or reproducing method includes, changing status information of blocks in an enlarged or newly allocated spare area when a spare area for a replacement block for replacing a defect block in a predetermined area of the medium is enlarged or newly allocated while using the medium, and recording the changed status information on the medium.

According to another aspect of the present invention, there is provided an information recording medium in which a defect list entry is recorded on the medium indicating that a block within an enlarged or newly allocated spare area is a usable or unusable replacement block when the spare area for a replacement block replacing a defect block is enlarged or newly allocated while using the medium.

According to an aspect of the present invention, when status information of the block in the enlarged or newly allocated spare area indicates a defect block with a replacement block, the defect list entry may indicate that the defect block and the replacement block are usable or unusable replacement blocks.

According to an aspect of the present invention, when status information of the block in the enlarged or newly allocated spare area indicates a defect block without a replacement block, the defect list entry may indicate that the defect block is a usable or unusable replacement block.

According to an aspect of the present invention, when status information of the block in the enlarged or newly allocated spare area indicates a possible defective block, the defect list entry may indicate that the possible defective block is a usable or unusable replacement block.

According to another aspect of the present invention, there is provided a recording and/or reproducing apparatus that records or reproduces data on or from an information recording medium. The recording and/or reproducing apparatus may include a controlling unit that controls the reading and/or writing unit to write a defect list entry indicating that a block within an enlarged or newly allocated spare area is a usable or unusable replacement block for replacement when the spare area for a replacement block for replacing a defect block in the medium is enlarged or newly allocated while using the medium.

According to another aspect of the present invention, there is provided a method of recording and/or reproducing data on/from an information recording medium. The method includes, recording a defect list entry indicating that a block within an enlarged or newly allocated spare area is a usable or unusable replacement block for a replacement when a spare area for a replacement block for replacing a defect block in a predetermined area of the medium is enlarged or newly allocated while using the medium.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIGS. 11A and 11B are reference diagrams illustrating a method of changing defect list entries of blocks within a newly allocated or enlarged spare area according to an embodiment of the present invention;

FIGS. 17A and 17B are reference diagrams for describing changing the list entry of the blocks within the newly allocated or enlarged spare area according to an embodiment of the present invention;

FIG. 22 is a view of an exemplary method of processing a defect list entry for improving performance of a drive according to an embodiment of the present invention.

DETAILED DESCRIPTION OF THE EMBODIMENTS

Figure 1:
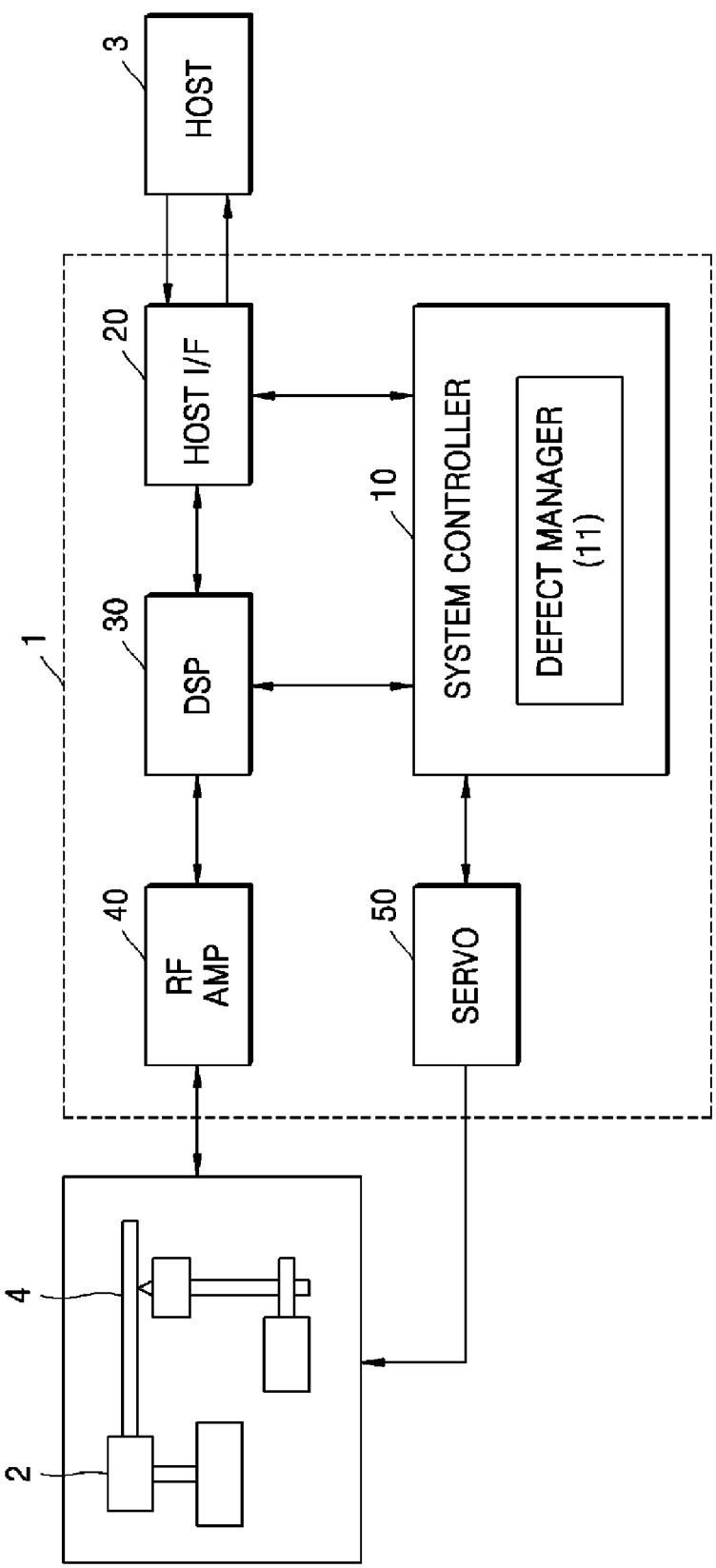
FIG. 1 is a block diagram illustrating a structure of a recording and/or reproducing apparatus according to an embodiment of the present invention.

Reference will now be made in detail to the embodiments of the present invention, examples of which are illustrated in the accompanying drawings, wherein like reference numerals refer to the like elements throughout. The embodiments are described below in order to explain the present invention by referring to the figures.

FIG. 1 is a block diagram illustrating a structure of a recording and/or reproducing apparatus according to an embodiment of the present invention.

Referring to FIG. 1, the recording and/or reproducing apparatus includes a reading and/or writing unit 2 and a controlling unit 1.

The reading and/or writing unit 2 includes a pickup device, and writes data on a disc 4, which is an optical recording medium according to an embodiment of the present invention.

The controlling unit 1 controls reading and writing of data from and on the disc 4 according to a predetermined file system. Particularly, when there is not enough space for writing a replacement block that replaces a defect that occurred in a spare area (a predetermined area of the disc 4) allocated when initializing the disc 4, the controlling unit 1 allocates a new spare area or enlarges the current spare area and manages a defect status of blocks in a newly allocated spare area or the enlarged spare area.

The controlling unit 1 includes a system controller 10, a host interface (I/F) 20, a digital signal processor (DSP) 30, a radio frequency amplifier (RF AMP) 40, and a servo 50.

To write data on the disc 4, the host I/F 20 receives a predetermined write command from a host 3 and transmits the predetermined write command to the system controller 10. The system controller 10 controls the DSP 30 and the servo 50 in order to perform the write command received from the host I/F 20. The DSP 30 adds additional data such as parity data for correcting an error of data that is to be written and received from the host I/F 20, performs an error correction code (ECC) encoding, and produces ECC blocks, which are error correction blocks, and then modulates the ECC blocks into a predetermined form. The RF AMP 40 converts data output from the DSP 30 into an RF signal. The reading and/or writing unit 2 having the pickup device records the RF signal received from the RF AMP 40 onto the disc 4. The servo 50 receives a command needed for servo control from the system controller 10 and the servo 50 controls the pickup device of the reading and/or writing unit 2.

Particularly, the system controller 10 includes a defect manager 11 for managing a defect status of the blocks of the enlarged or the newly allocated spare area.

The defect manager 11 changes defect status information of the blocks within the enlarged or the newly allocated spare area.

If defect status information of the block within the enlarged or the newly allocated spare area indicates a defect block with a replacement block, the defect manager 11 generates a defect list entry including status information indicating that the defect block and the replacement block are usable or unusable replacement blocks.

For example, the defect manager 11 controls the reading and/or writing unit 2 to record defect status information indicating that the defect block and the replacement block are unusable replacement blocks. In other words, a defect list entry is created including the defect status information indicating that the defect block and the replacement block are unusable replacement blocks, and the defect list entry is recorded on a predetermined area (i.e., a defect management area (DMA)) of the disc 4. In addition, in this case, the defect manager 11 may control the reading and/or writing unit 2 to record the defect list entry including the status information indicating that the replacement block is an unusable replacement block and record a defect list entry including status information indicating that the defect block is an unusable replacement block.

Also, the defect manager 11 examines the block within the enlarged or the newly allocated spare area and if defect status information of the block indicates a defect block without a replacement block, the defect manager 11 controls the reading and/or writing unit 2 so that the defect status information is recorded as a defect list entry including status information indicating that a replacement block is usable or unusable for replacement.

For example, when defect status information of the block within the enlarged or the newly allocated spare area indicates a replacement block without a defect block, the defect manager 11 controls the reading and/or writing unit 2 to record a defect list entry including defect status information indicating that a replacement block is unusable.

Also, the defect manager 11 examines the block within the enlarged or the newly allocated spare area and if defect status information of the block indicates a possible defective block, the defect manager 11 controls the reading and/or writing unit 2 so that the defect status information is recorded as a defect list entry including status information indicating that a replacement block is usable or unusable.

For example, when defect status information of the block within the enlarged or the newly allocated spare area indicates a possible defective block, the defect manager 11 certifies whether there is a defect regarding the block, and controls the reading and/or writing unit 2 to record a defect list entry including defect status information indicating that a replacement block is unusable. If there is no defect, the defect manager 11 controls recording of a defect list entry including defect status information indicating that a replacement block is usable.

The certification means checking whether a block has a defect. For example, a certification method includes "verify after write."

Also, when defect status information of the block within the enlarged or the newly allocated spare area indicates a possible defective block, the defect manager 11 may control the reading and/or writing unit 2 to record a defect status information indicating that a replacement block is usable according to a selection of a user or a drive manufacturer.

In addition, when defect status information of the block within the enlarged or the newly allocated spare area is not recorded, the defect manager 11 controls the reading and/or writing unit 2 to record a defect list entry including defect status information indicating that a replacement block is usable.

Particularly, if the disc 4 is a write-once disc, when the block within the enlarged or the newly allocated spare area is used, the defect manager 11 controls recording of a defect list entry including defect status information indicating that a replacement block is unusable. This is because the block cannot be written again even through there is a defect in a recorded block.

Also, when the disc 4 is a write-once disc, and the block within the enlarged or the newly allocated spare area is not yet used and defect status information of the block is not recorded, the defect manager 11 controls recording of a defect list entry including defect status information indicating that a replacement block is usable. Although data cannot be recorded again in the write-once disc, the disc may have a defect list entry including defect status information according to a predetermined rule. Thus, a replacement block that is usable when not yet used and having no defect list entry may be indicated.

To reproduce data from the disc 4, the host I/F 20 receives a reproduction command from the host 3. The system controller 10 performs initialization needed for data reproduction. The reading and/or writing unit 2 emits a laser beam onto the disc 4, and outputs an optical signal obtained by receiving the laser beam reflected from the disc 4. The RF AMP 40 converts the optical signal output from the reading and/or writing unit 2 into an RF signal, and provides modulated data obtained from the RF signal to the DSP 30 while providing a servo signal to the servo 50 for a control obtained from the RF signal. The DSP 30 demodulates the modulated data, and outputs data obtained by performing an ECC error correction. Meanwhile, the servo 50 receives the servo signal from the RF AMP 40 and the command for the servo control from the system controller 10, and performs the servo control on the pickup. The host I/F 20 transmits the data received from the DSP 30 to the host 3.

A structure of the optical recording medium according to an embodiment of the present invention will now be described.

Figure 2:
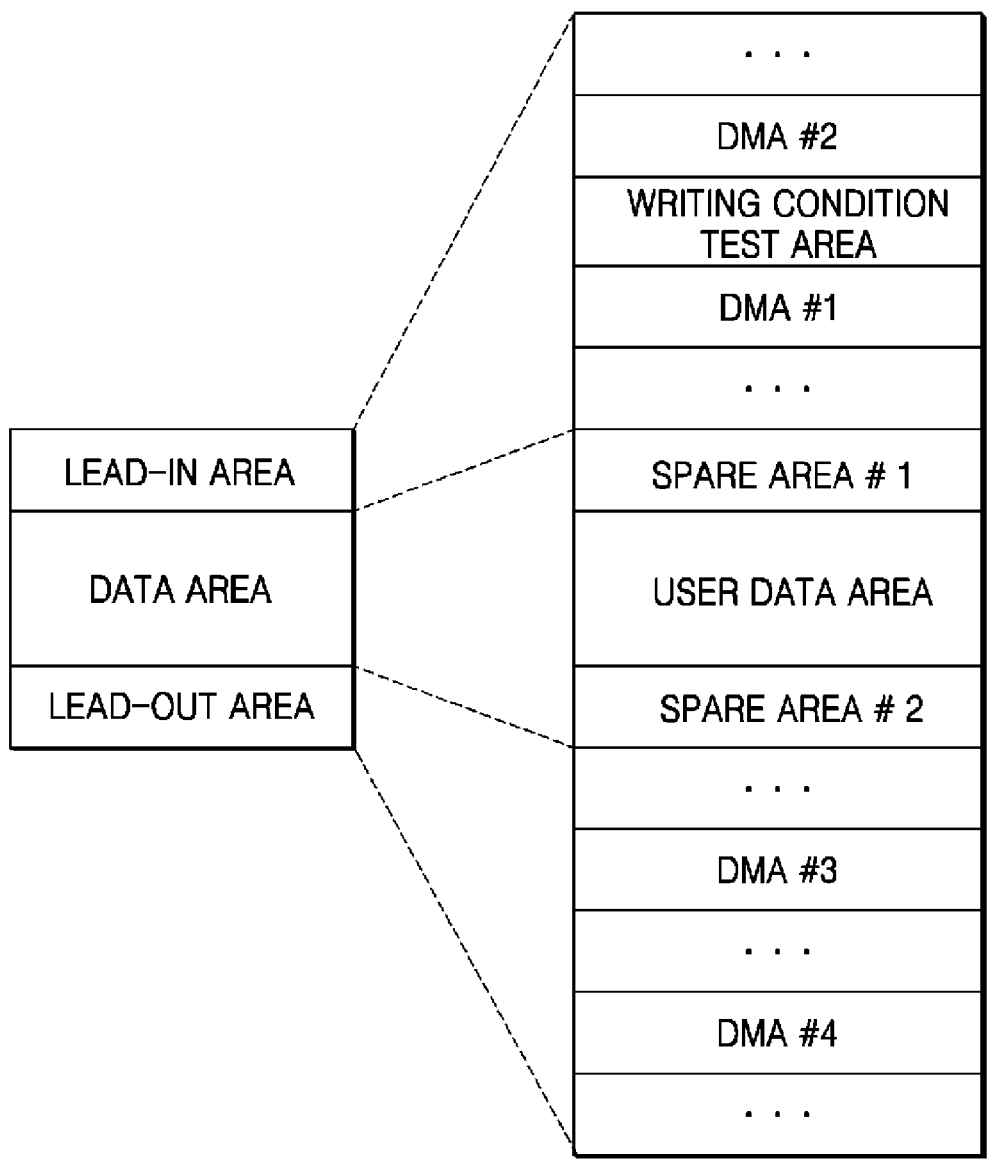
FIG. 2 is a structural diagram of a single recording layer disc according to an embodiment of the present invention.

FIG. 2 is a structural diagram of a single recording layer disc according to an embodiment of the present invention.

Referring to FIG. 2, the disc includes a lead-in area at an inner circumference, a lead-out area at an outer circumference, and a data area therebetween in a radial direction of the disc.

The lead-in area includes a DMA # 2, a recording or writing condition test area, and a DMA # 1. The data area includes a spare area # 1, a user data area, and a spare area # 2. The lead-out area includes a DMA # 3 and a DMA # 4.

The DMA is an area to record defect management information in a rewritable information storage medium. The DMA is either at an inner area or an outer area of the disc 4.

A user of a drive manufacturer may decide sizes and whether to allocate spare areas to write a replacement block to replace a defect block when the defect has occurred in a predetermined area of the user data area of the disc 4 when initializing the data area. Alternatively, the spare areas may be newly allocated or enlarged while using the disc 4.

Defect management information that is recorded on the DMA is composed of a defect list for defect information and a disc definition structure (DDS), which has information on a structure of a data area.

The defect list includes a defect list header and a defect list entry. A format of the defect list will be described in more detail with reference to FIG. 4 later.

The recording condition test area is for determining optimum recording power by testing various recording powers according to a write strategy and variables according to the write strategy.

Figure 3:
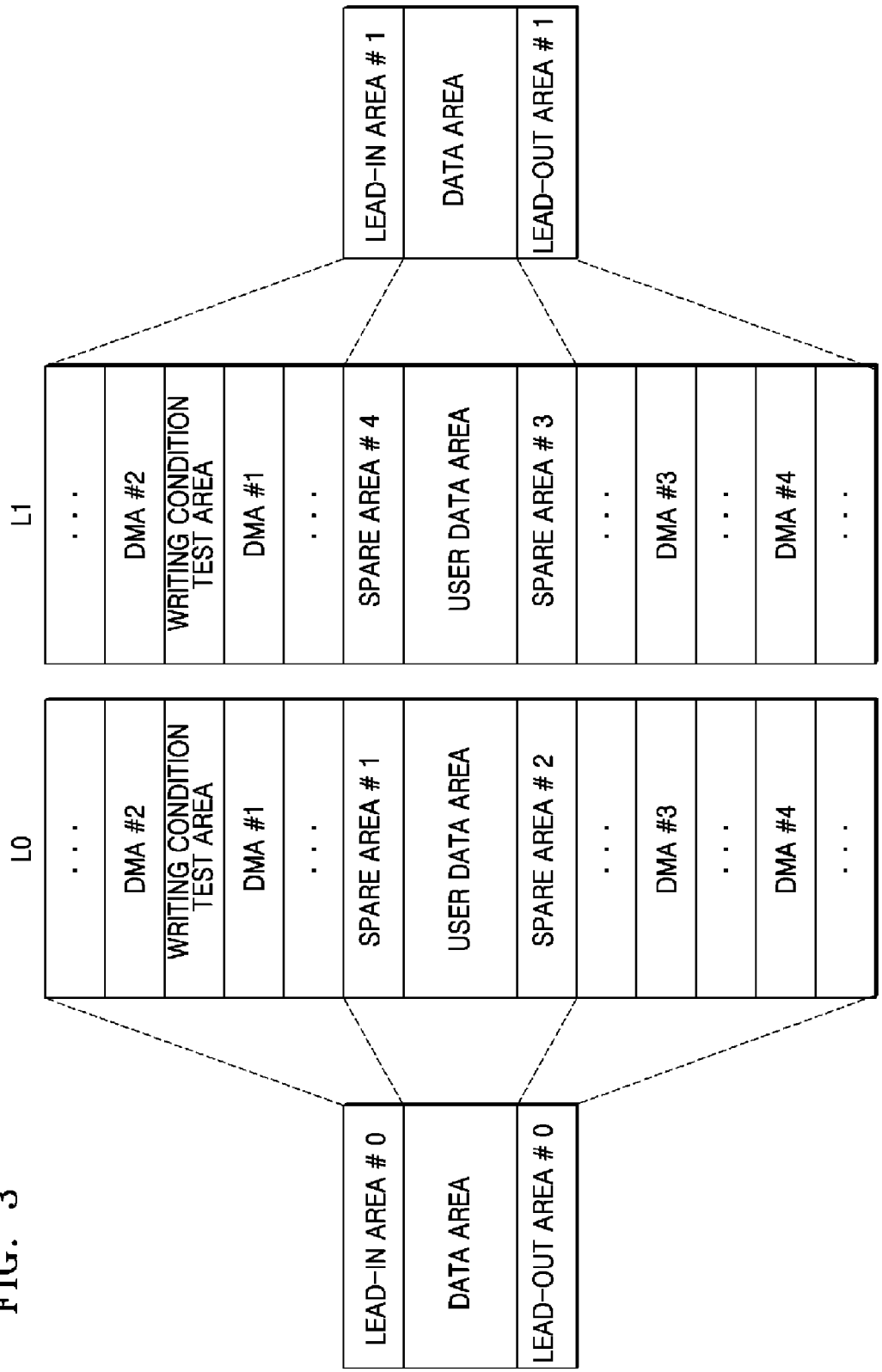
FIG. 3 is a structural diagram of a double recording layer disc according to an embodiment of the present invention.

FIG. 3 is a structural diagram of a double recording layer disc according to an embodiment of the present invention.

Referring to FIG. 3, one recording layer L0 includes a lead-in area # 0, a data area, and a lead-out area # 0, and another recording layer L1 includes a lead-in area # 1, a data area, and a lead-out area # 1.

The lead-in area # 0 of the L0 layer includes a DMA # 2, a recording or writing condition test area, and a DMA # 1. The data area of the L0 layer includes a spare area # 1, a user data area, and a spare area # 2. The lead-out area # 0 of the L0 layer includes a DMA # 3 and a DMA # 4.

The lead-in area # 0 of the L1 layer includes a DMA # 2, a recording or writing condition test area, and a DMA # 1. The data area of the L1 layer includes a spare area # 4, a user data area, and a spare area # 3. The lead-out area # 1 of the L1 layer includes a DMA # 3 and a DMA # 4.

Figure 4:
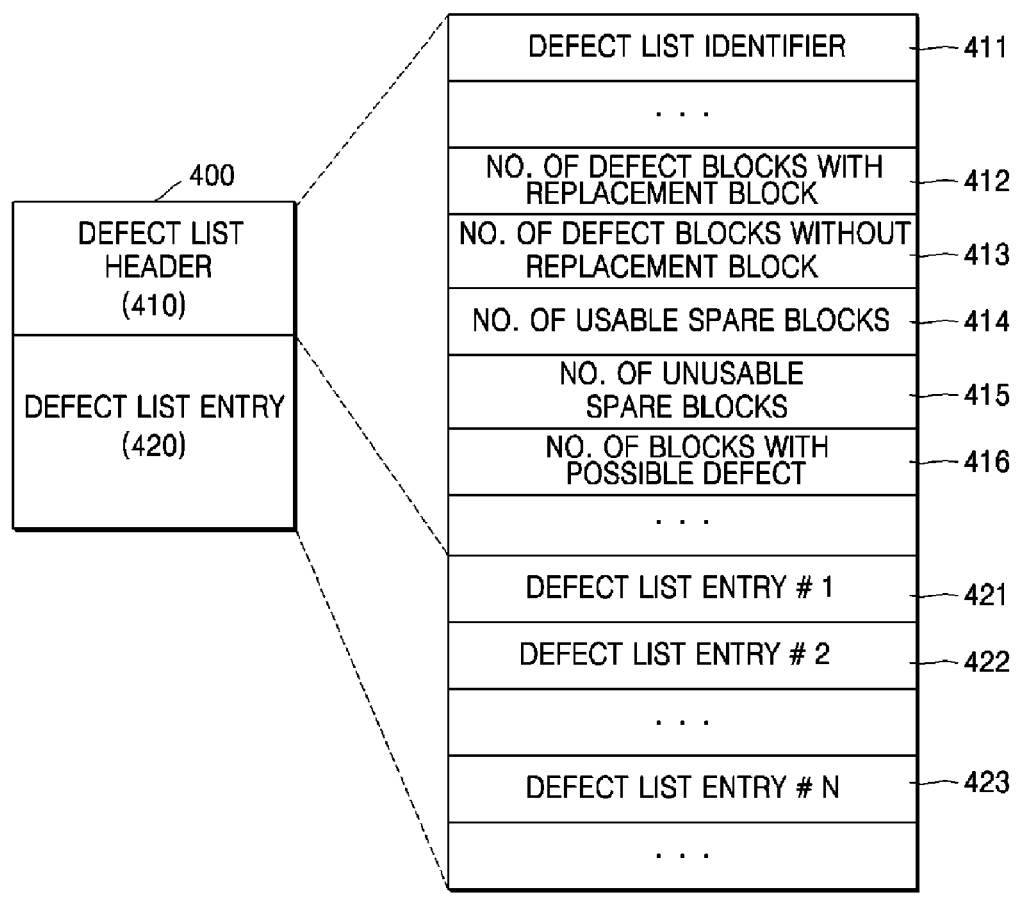
FIG. 4 is a structural diagram of a data format of a defect list according to an embodiment of the present invention.

FIG. 4 is a structural diagram of a data format of a defect list 400 according to an embodiment of the present invention.

Referring to FIG. 4, the defect list 400 includes a defect list header 410 and a defect list entry 420.

The defect list header 410 comprises number information for a defect management of blocks. The defect list header 410 includes information on a number 412 of defect blocks with a replacement block, a number 413 of defect blocks without a replacement block, a number 414 of usable spare blocks, a number 415 of non-usable spare blocks, and a number 416 of possible defective blocks.

The number 412 of the defect blocks with the replacement block denotes a number of defect list entries having defect status information indicating that defect blocks have been replaced with replacement blocks within a spare area.

The number 413 of the defect blocks without the replacement block denotes a number of defect list entries having defect status information indicating a defect block without a replacement block within a spare area.

The number 414 of the usable spare blocks denotes a number of defect list entries having defect status information indicating a block that can be used as a replacement among blocks that are not replaced within a spare area.

The number 415 of the non-usable spare blocks denotes a number of defect list entries having defect status information indicating a block that cannot be used as a replacement among blocks that are not replaced within a spare area.

The number 416 of the possible defective blocks denotes a number of defect list entries having defect status information indicating a block with a possible but not yet verified defect among blocks within a user data area.

The defect list entry 420 is a collection of defect list entries having defect status information on blocks. The defect list entry 420 includes a defect list entry # 1 421, a defect list entry # 2 422, . . . , and a defect list entry # N 423.

Figure 5:
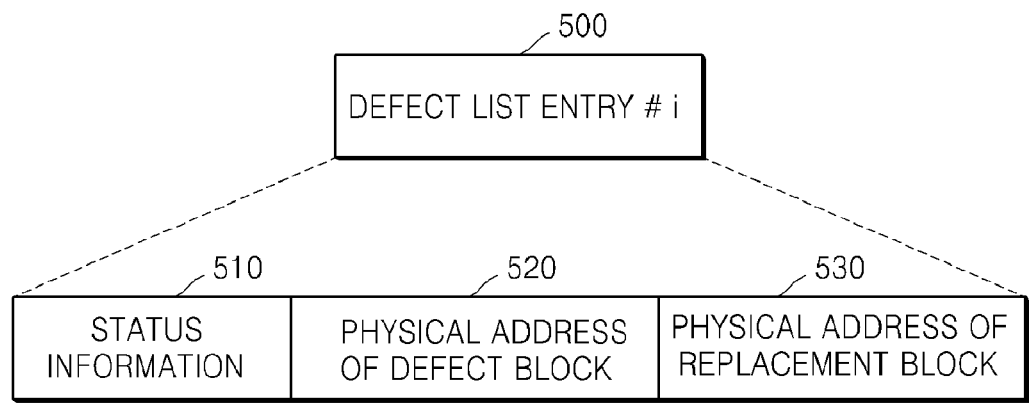
FIG. 5 is a structural diagram of a data format of a defect list entry illustrated in FIG. 4.

FIG. 5 is a structural diagram of a data format of a defect list entry illustrated in FIG. 4.

Referring to FIG. 5, a defect list entry # i 500 includes status information 510, a physical address 520 of a defect block, and a physical address 530 of a replacement block.

The status information 510 is defect status information of defect blocks, the physical address 520 of the defect block is a physical address at which the defect block is located within a user data area, and the physical address 530 of the replacement block is a physical address at which the replacement block is located within a spare area.

Figure 6:
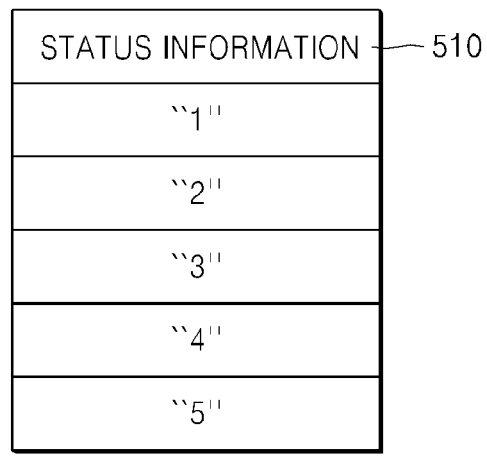
FIG. 6 is a reference diagram illustrating status information of the defect list entry illustrated in FIG. 5.

FIG. 6 is a reference diagram illustrating the status information of the defect list entry # i 500 illustrated in FIG. 5.

Referring to FIG. 6, the status information 510 includes five states, "1," "2," "3," "4," and "5."

Status information "1" indicates a status of a defect block with a replacement block. In this case, a physical address of the defect block indicates a physical address of a defect block within a user data area. A physical address of the replacement block is a physical address at which a replacement block that replaces the defect block is recorded in a spare area.

Status information "2" indicates a status of a defect block without a replacement block. In this case, a physical address of the defect block indicates a physical address of a replacement block within a user data.

Status information "3" indicates a status of a possible defective block. In this case, a physical address of a block with a possible but not yet verified defect is indicated.

Status information "4" indicates a status of a usable block of the spare area. This is for indicating a status of a block existing in the spare area. In this case, a physical address of a replacement block indicates a physical address of a usable block among unreplaced blocks of the spare area.

Status information "5" indicates a status of an unusable block of the spare area. This is for indicating a status of a block existing in the spare area. In this case, a physical address of a replacement block indicates a physical address of an unusable block among unreplaced blocks of the spare area.

Figure 7:
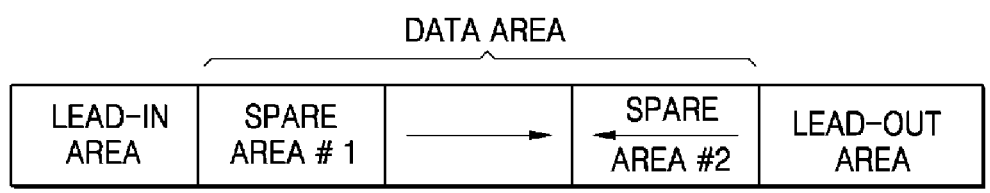
FIG. 7 is a reference diagram illustrating usage directions of a user data area and a spare area in a single recording layer disc according to an embodiment of the present invention.

FIG. 7 is a reference diagram illustrating usage directions of a user data area and a spare area in a single recording layer disc according to an embodiment of the present invention.

Referring to FIG. 7, if a usage direction of the user data area is from a lead-in area to a lead-out area in a data area and only a spare area # 1 is initially allocated, a spare area # 2 can be newly allocated in the data area near the lead-out area, as illustrated in FIG. 7, and if a spare area # 2 is already initially allocated, the spare area # 2 can be enlarged in an opposite direction of the usage direction of the user data area. As such, by considering the usage directions of the user data area and the spare area, a new spare area can be allocated or a spare area can be enlarged more conveniently.

Figure 8:
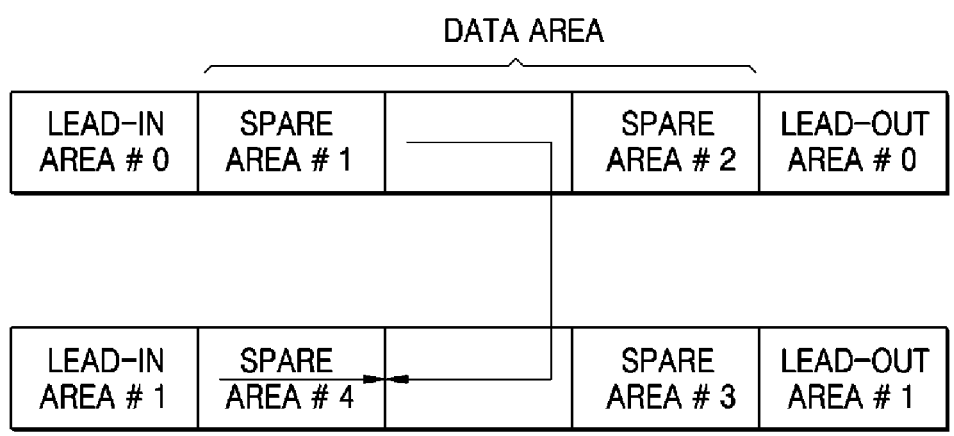
FIG. 8 is a reference diagram illustrating usage directions of a user data area and a spare area in a double recording layer disc according to an embodiment of the present invention.

FIG. 8 is a reference diagram illustrating usage directions of a user data area and a spare area in a double recording layer disc according to an embodiment of the present invention.

Referring to FIG. 8, if a usage direction of the user data area is from a lead-in area # 0 to a lead-in area # 1 via a lead-out area # 0 and a lead-out area # 1 in a data area and only spare areas # 1, 2, and 3 are initially allocated, a spare area # 4 can be newly allocated in the data area near the lead-out area # 1, as illustrated in FIG. 8, and if a spare area # 4 is already initially allocated, the spare area # 4 can be enlarged in an opposite direction of the usage direction of the user data area. As such, by considering the usage directions of the user data area and the spare area, a new spare area can be allocated or a spare area can be enlarged more conveniently.

Figure 9A:
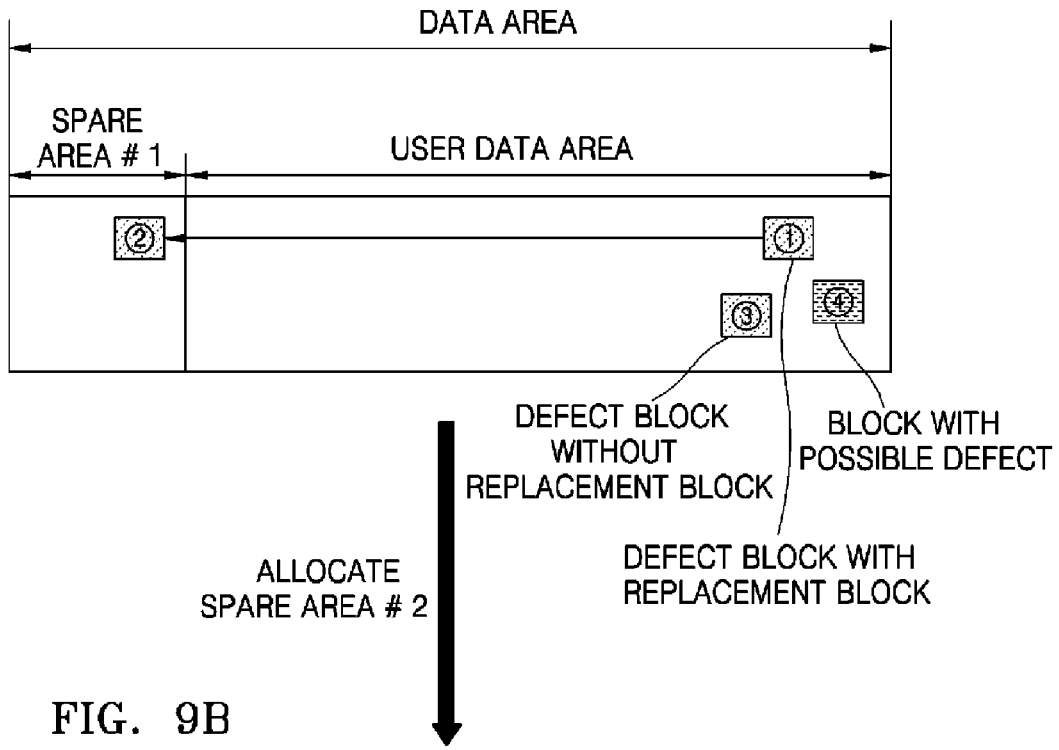
FIGS. 9A and 9B are reference diagrams illustrating a method of processing a defect list entry of a block within a newly allocated spare area according to an embodiment of the present invention.
Figure 9B:
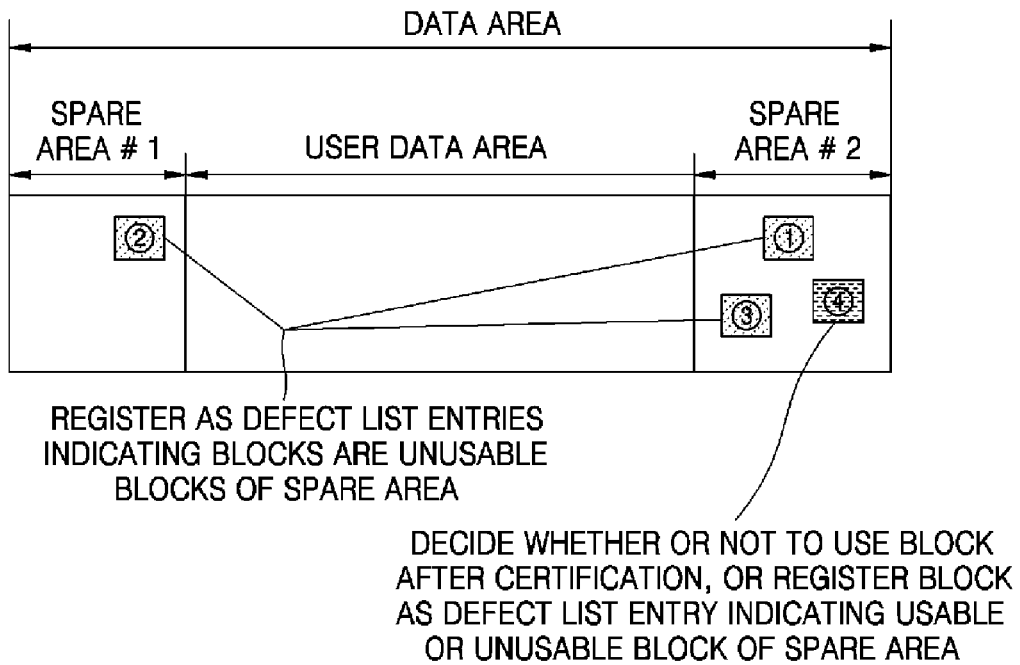

FIGS. 9A and 9B are reference diagrams describing a method of processing a defect list entry of a block within a newly allocated spare area according to an embodiment of the present invention.

FIG. 9A is a view illustrating a status of a data block in a single layer disc in which only a spare area # 1 is allocated and used at the initialization, and FIG. 9B is a view illustrating processed status information of blocks included in a spare area # 2 in the disc, which has the spare area # 2 allocated therein while using the disc.

Referring to FIG. 9A, only a spare area # 1 is initially allocated in a data area, and thus the data area includes the spare area # 1 and a user data area.

Blocks ①, ③ and ④ are recorded at the end of the user data area. The block ① is a defect block, and a replacement block ② that is to replace the defect block is recorded in the spare area # 1. The block ③ is a defect block, but does not have a replacement block to replace the defect block in the spare area # 1. The block ④ is a possible defective block.

While using the disc in the current state, if a spare area # 2 is allocated at the end of the user data area including an area in which the blocks ①, ③, and ④ are newly allocated, the current state becomes as illustrated in FIG. 9B.

Referring to FIG. 9B, a spare area # 2 is allocated at the end of the data area, and thus the data area includes the spare area # 1, the user data area, and the spare area # 2.

In this case, regarding the block ① that has the replacement block, a defect list entry is recorded indicating that the defect block ① and the replacement block ② are unusable blocks of a spare area. That is, a defect list entry of a defect block having a replacement block is converted into two defect list entries indicating unusable blocks of a spare area.

The need for registering the defect list entries indicating the defect block ① and the replacement block ② are unusable blocks of the spare area is as follows. As described above with reference to FIG. 7, in the single layer disc the usage direction of the spare area # 2 is set as the opposite of the usage direction of the user data area to make expansion of the spare area # 2. That is, the spare area # 2 is used in the direction from an outer circumference to the inner circumference of the disc.

Thus, when a defect block with a replacement block is inside the expanded spare area # 2, a replacement block that replaces the defect block is not actually a defect block. However, considering the usage direction of the spare area # 2, the replacement block should not be used. In addition, the defect block within the enlarged spare area # 2 already has a defect, and thus the defect block should not be used as a replacement block. If the defect block is not registered as a defect list entry indicating the defect block is an unusable block of a spare area, a drive system will use the defect block for replacement in the future. However, because the defect block had a defect beforehand, reliability of data of the defect block is not guaranteed. In addition, even if the data is verified after writing the data on the defect block, there is a high possibility that the defect block can develop a defect again because the defect block already had a defect. Therefore, if the defect block is determined to have a defect, the defect block will be replaced with the next block of the spare area based on the usage order of the spare area. In this process, a lot of time is wasted in replacing the defect blocks, and results in lowering the efficiency of the drive system. Therefore, by registering the defect block within the enlarged spare area # 2 indicating the defect block is an unusable block of a spare area, unnecessary operations of the drive system is reduced while maintaining the efficiency of the drive system.

Also, regarding the block ③ without the replacement block, a defect list entry indicating the defect block ③ is an unusable block of a spare area is recorded thereon. In this case, a defect list entry is changed into a defect list entry of a spare area.

Regarding the block ④ with a possible defect, certification of the block ④ located in the actual physical address may be performed or a defect list entry according to a pre-set plan without certification may be recorded thereon. In more detail, in the case of certifying a possible defective block and registering a defect list entry according to the result of the certification, when there is no defect in the block after certification of the block, a defect list entry indicating the block is a usable block of the spare area is registered thereon, and if there is a defect in the block, a defect list entry indicating the block is an unusable block of a spare area is registered thereon. In the case of registering a defect list entry without certification of the block according to the pre-set plan, a defect list entry indicating the block is a usable or an unusable block of a spare area according to a predetermined rule (i.e., a selection of a drive manufacturer or a user) is registered.

Figure 10A:
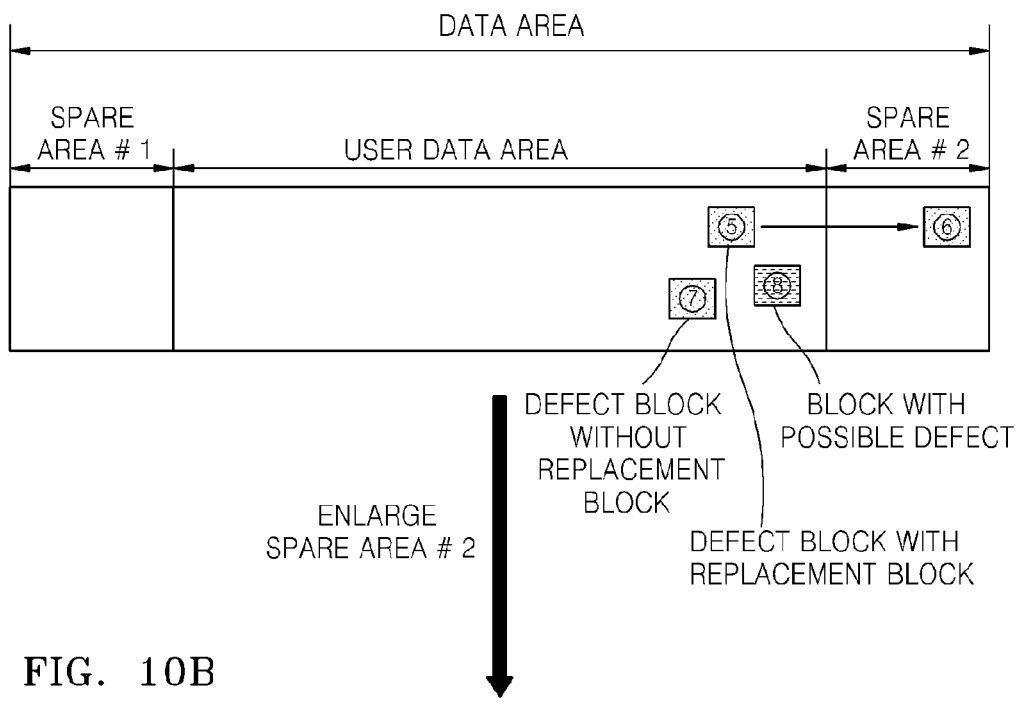
FIGS. 10A and 10B are reference diagrams illustrating a method of processing a defect list entry of a block within an enlarged spare area according to an embodiment of the present invention.
Figure 10B:
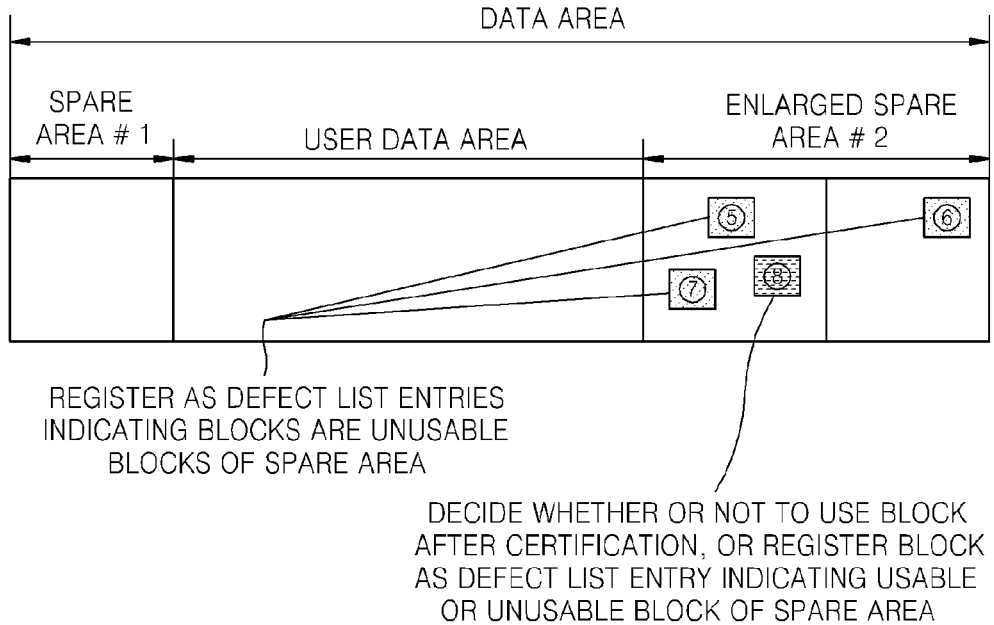

FIGS. 10A and 10B are reference diagrams for describing a method of processing a defect list entry of a block within an enlarged spare area according to an embodiment of the present invention.

FIG. 10A is a view illustrating a status of a data block in a single layer disc in which spare areas # 1 and # 2 are allocated and used at the initialization, and FIG. 10B is a view illustrating processed status information of blocks included in an enlarged spare area # 2 when the spare area # 2 needs to be enlarged while using the disc.

Referring to FIG. 10A, initially, a data area includes the spare area # 1, a user data area, and the spare area # 2. Blocks ⑤, ⑦, and ⑧ are located at the end of the user data area. Block ⑤ is a defect block, and a replacement block ⑥ is located in the spare area # 2 to replace the defect block. Block ⑦ is also a defect block and has a defect therein, but a replacement block to replace the defect block does not exist in either the spare area # 1 or the spare area # 2. Block ⑧ is a possible defective block.

In such a state, if the spare area # 2 is expanded to the user data area where the blocks ⑤, ⑦, and ⑧ are located while using the disc, the current state becomes as illustrated in FIG. 10B.

Referring to FIG. 10B, the data area includes the spare area # 1, the user data area, and the enlarged spare area # 2.

In this case, regarding the defect block ⑤ with the replacement block, a defect list entry indicating that the defect block ⑤ is an unusable block of the spare area and a defect list entry indicating that the replacement block ⑥ is an unusable block of the spare area are registered. That is, a defect list entry of a defect block having a replacement block is converted into two defect list entries indicating unusable blocks of the spare area.

Regarding the block ⑦ without the replacement block, a defect list entry indicating the defect block ⑦ is an unusable block of a spare area is registered. In this case, one defect list entry is changed into one defect list entry of a spare area.

The possible defective block ⑧ may be examined if there is a defect block in the block ⑧ at the actual physical address. Alternatively, a defect list entry according to a pre-set plan without certification may be registered. In more detail, in the case of examining the possible defective block ⑧ and registering the defect list entry according to the result of the certification, when there is no defect in the block ⑧ after examining the block ⑧, a defect list entry indicating the block ⑧ is a usable block of a spare area is registered, and if there is a defect in the block ⑧, a defect list entry indicating the block ⑧ is an unusable block of a spare area is registered. In the case of registering a defect list entry without examining the block ⑧ according to the pre-set plan, a defect list entry indicating the block ⑧ is a usable or an unusable block of a spare area according to a predetermined rule (i.e., a selection of a drive manufacturer or a user) may be registered.

So far, the description was related to a single recording layer disc, but the same method applies to a double layer recording disc.

FIGS. 11A and 11B are reference diagrams illustrating a method of changing defect list entries of blocks within a newly allocated or enlarged spare area according to an embodiment of the present invention.

Referring to FIGS. 11A and 11B, a changed state of defect list entries in situations described in FIGS. 9A through 10B is illustrated. A defect list entry before enlarging or allocating blocks, illustrated in FIG. 11A, is the defect list entry indicating the status information of the blocks before enlarging or newly allocating the spare area illustrated in FIG. 9A or 10A. A defect list entry after enlarging or allocating blocks, illustrated in FIG. 11B, is the defect list entry indicating the status information of the blocks after enlarging or newly allocating the spare area illustrated in FIG. 9B or 10B.

As described with reference to FIG. 6, status information "1" indicates status of a defect block with a replacement block, status information "2" indicates status of a defect block without a replacement block, status information "3" indicates status of a possible defective block, status information "4" indicates a status of a usable block of a spare area, and status information "5" indicates a status of an unusable block of a spare area.

For a defect list entry of block ① before enlarging or allocating a spare area, its status information is "1," a physical address of a defect block is "0010000h," and a physical address of a replacement block is "0100000h." After the spare area is enlarged or newly allocated regarding the block ①, two defect list entries are registered as illustrated in FIG. 11B. That is, the two defect list entries are a defect list entry with status information regarding a defect block ① is "4" and a physical address of a replacement block is "0010110h"; and a defect list entry with status information regarding a replacement block is "5" and a physical address of the replacement block is "0100000h."

A defect list entry of block ③ before enlarging or allocating a spare area has status information of "2," a physical address of a defect block is "0010100h," and since there is no replacement block, there is no physical address of a replacement block. After the spare area is enlarged or newly allocated regarding the block ③, a defect list entry with status information of "5" and a physical address of a replacement block as "0010100h" is registered as illustrated in FIG. 11B.

A defect list entry of block ④ before enlarging or allocating a spare area has status information of "3," a physical address of a defect block is "0010110h," and since there is no replacement block, there is no physical address of a replacement block. After the spare area is enlarged or newly allocated regarding the block ④, a defect list entry with status information of "4" and a physical address of a replacement block as "0010110h" is registered as illustrated in FIG. 11B. Accordingly a variety of methods of registering a defect list entry of a possible defective block was described above.

All blocks within the enlarged or newly allocated spare area is one of a defect block with a replacement block, a usable block of a spare area, and/or an unusable spare block. Therefore, the number of blocks of the overall spare area satisfies the following Equation.

No. of Blocks of Overall Spare Area=No. of Usable Blocks of Spare Area+No. of Unusable Blocks of Spare Area+No. of Defect Blocks with Replacement block    (1)

In other words, for each of the blocks within the spare area, a physical address of the replacement block is a physical address of the blocks within the spare area, and only a defect list entry having status information of "1," "4," or "5" is possible. Of course, in the case of the replacement block, a physical address of a defect block of a defect list entry of the replacement block needs to be a physical address of a block within a user data area.

Figure 12A:
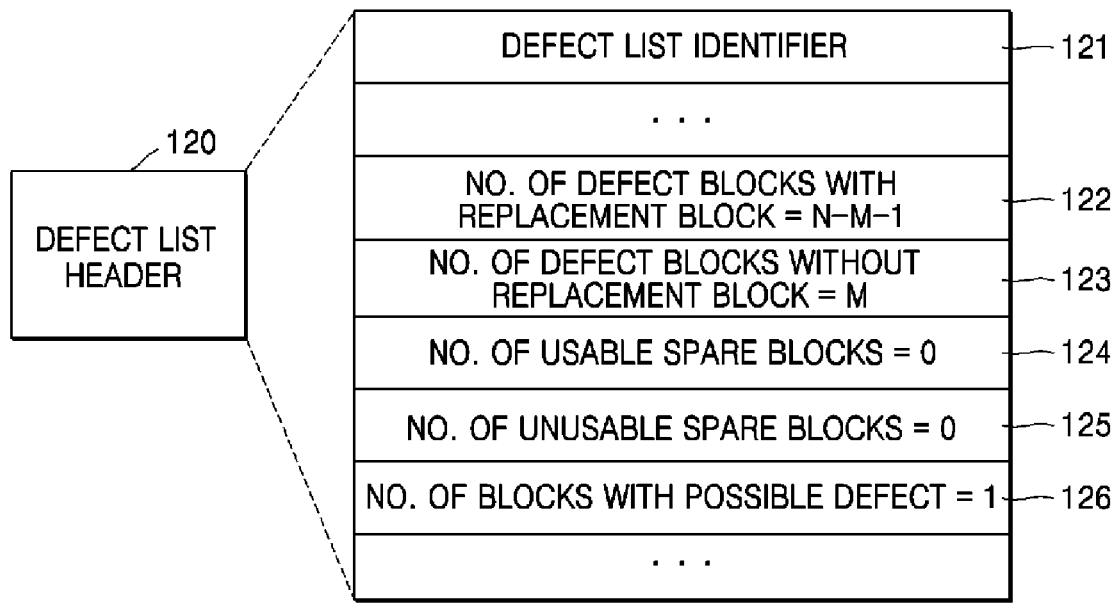
FIG. 12A is a view of a status of data of a defect list header right before enlarging or allocating a spare area according to an embodiment of the present invention.
Figure 12B:
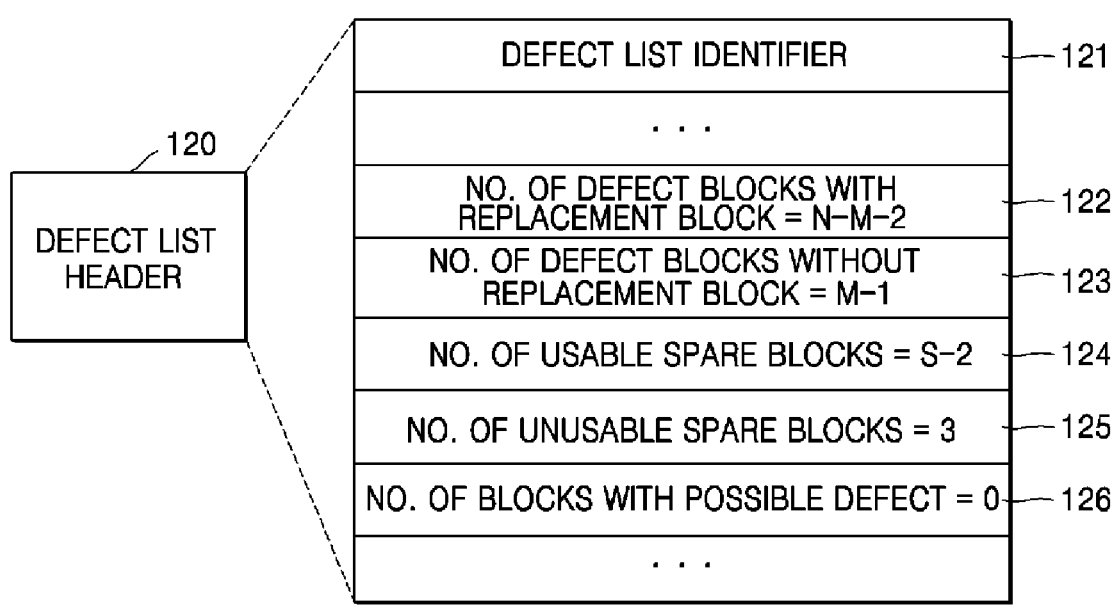
FIG. 12B is a view of a status of data of the defect list header right after enlarging or allocating the spare area according to an embodiment of the present invention.

FIG. 12A is a view of a status of data of a defect list header 120 right before enlarging or allocating a spare area according to an embodiment of the present invention. FIG. 12B is a view of a status of data of the defect list header 120 right after enlarging or allocating the spare area according to an embodiment of the present invention.

Referring to FIG. 12A, the defect list header 120 includes a defect list identifier 121, and a spare area in which no more replacement blocks are left because they are all used for replacement. Therefore, the number of usable spare blocks 124 is "0." Also, the number of unusable spare blocks 125 is also "0" because blocks within the spare area are satisfactory. The number of defect blocks with a replacement block 122 is "N−M−1," the number of defect blocks without an alternative bock 123 is "M," and the number of possible defective blocks 126 is "1."

Therefore, a total of N−M−1+0+0+1=N defect list entries exist. Also, the number of total blocks of the spare area is "number of defect blocks with replacement blocks 122"+number of usable spare blocks 124"+number of unusable spare blocks 125"=N−M−1+0+0=N−M−1.

In such a state, it is assumed that a spare area with S blocks is enlarged or newly allocated because there is no block of the spare area to replace. Also, it is assumed that there is one defect block with a replacement block, one defect block without a replacement block, and one possible defective block within the enlarged or newly allocated spare area, as illustrated in FIG. 11A. Then, immediately after enlarging or allocating the spare area, the spare area is changed into a defect list entry as illustrated in FIG. 11B, and the contents of the defect list header 120 is changed as illustrated in FIG. 12B. That is, the number of defect blocks with the replacement block 122 is changed from "N−M−1" to "N−M−2," the number of defect blocks without the alternative bock 123 is changed from "M" to "M−1," the number of usable spare blocks 124 is changed from "0" to S−2, the number of unusable spare blocks 125 is changed from "0" to "3," and the number of possible defective blocks 126 is changed from "1" to "0."

Therefore, a total of N−M−2+M−1+S−2+3+0=N+S−2 defect list entries exist. Also, "a number of blocks of the overall spare area" is "N−M−1" before enlarging or allocating the spare area and is "S" after enlarging or allocating the spare area. Thus, "the number of blocks of the overall spare area"=N−M−1+S, and "the number of defect blocks with the replacement block 122"+"the number of usable spare blocks 124"+"the number of unusable spare blocks 125"=N−M−2+S−2+3=N−M−1+S. Therefore, Equation 1 is satisfied.

Figure 13A:
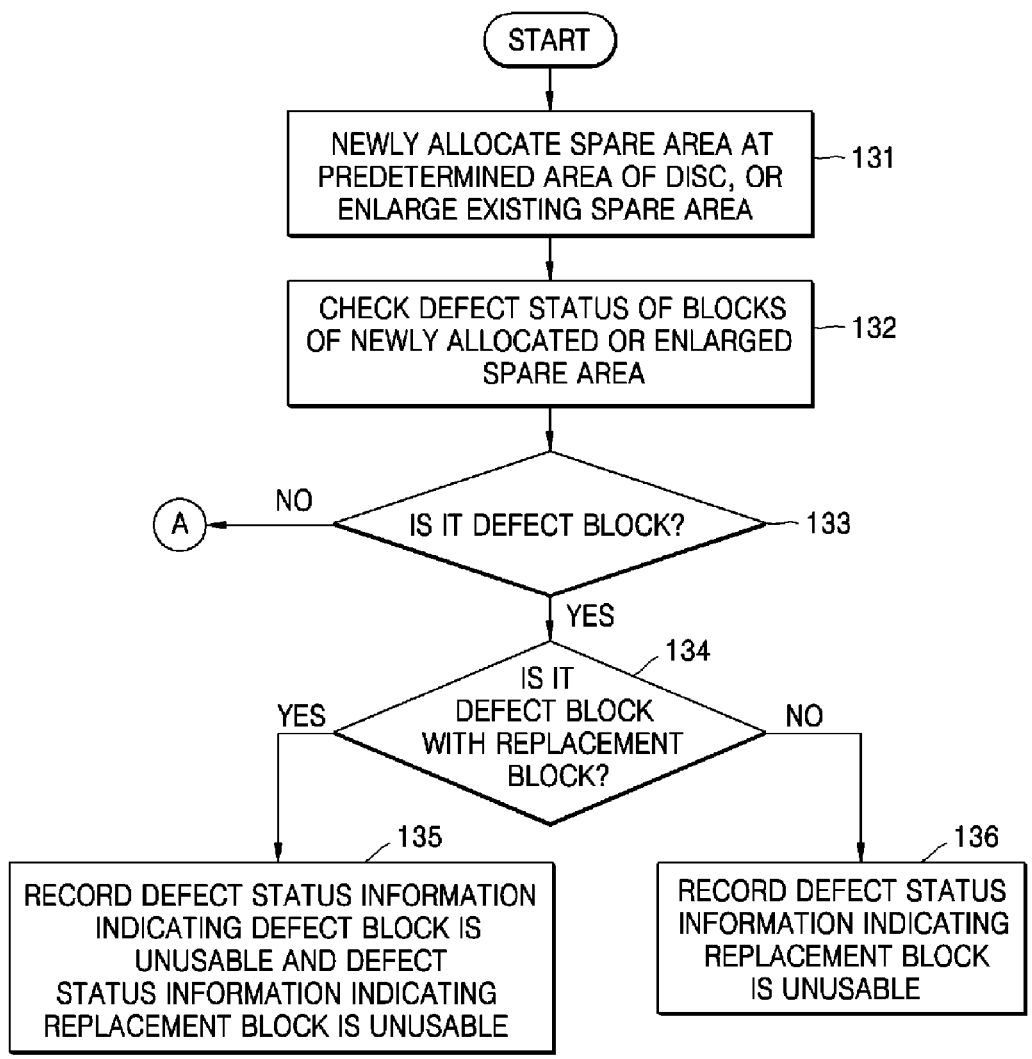
FIGS. 13A through 13C are flowcharts illustrating a method of defect management according to an embodiment of the present invention.
Figure 13B:
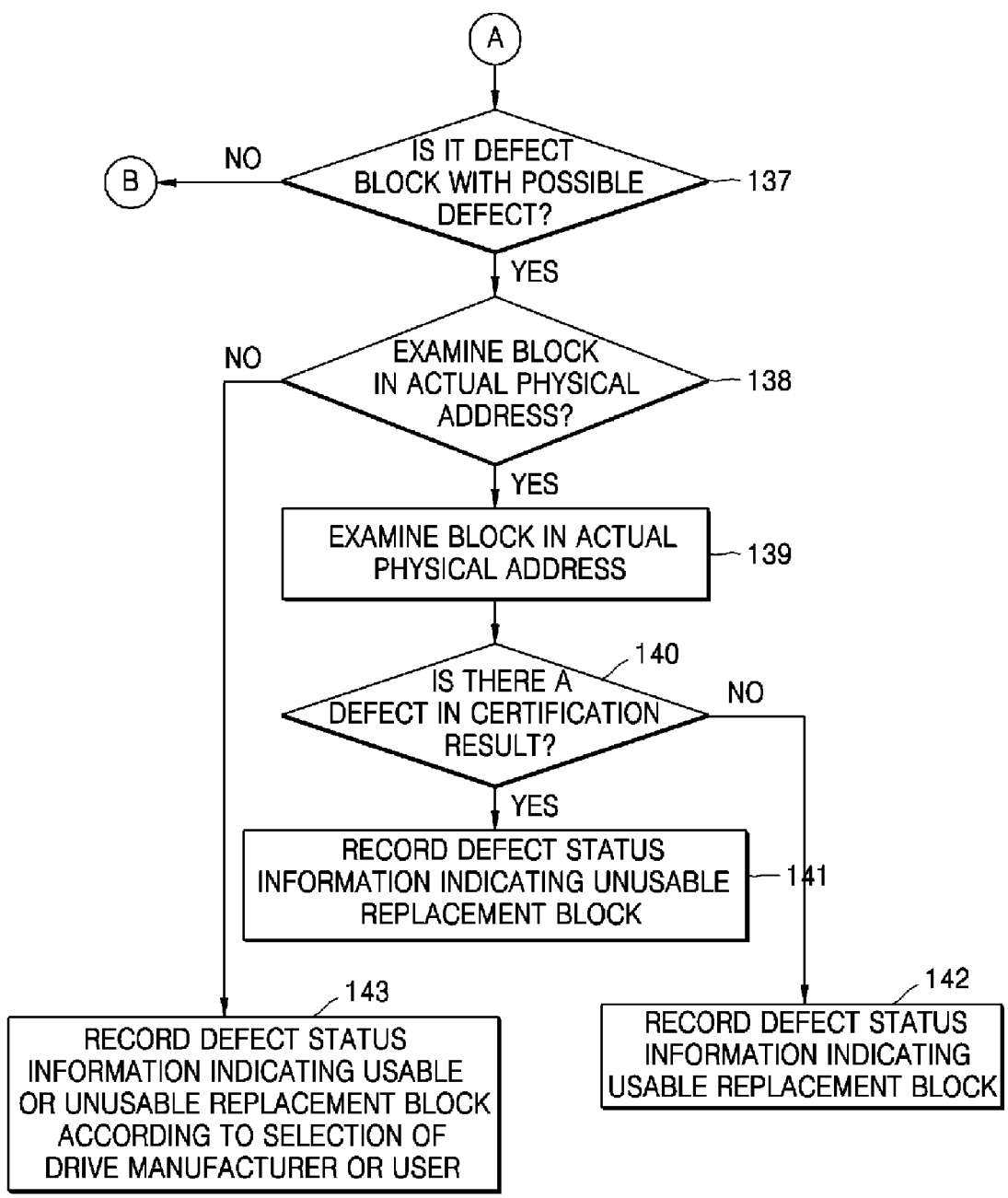
Figure 13C:
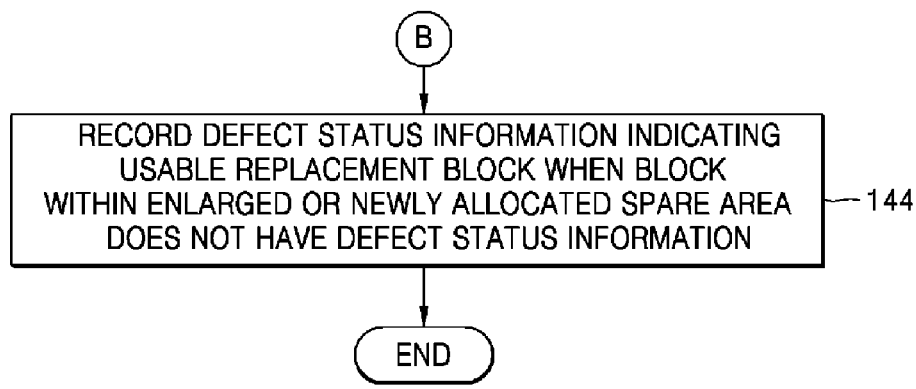

FIGS. 13A through 13C are flowcharts illustrating a method of defect management in an optical recording medium according to an embodiment of the present invention.

Referring to FIG. 13A, first, a spare area is newly allocated to a predetermined area of a disc or the existing spare area is enlarged (Operation 131). That is, when all of the spare area existing in the disc is used up or there is not much space left in the spare area, a new spare area is allocated or the spare area is enlarged.

Then, defect status of blocks existing in the newly allocated or enlarged spare area is checked (Operation 132). That is, by managing the defect status of the blocks in the newly allocated or enlarged spare area, blocks with a defect or a high possibility of a defect occurrence within the spare area are not used again.

It is examined whether the block within the newly allocated or enlarged spare area is a defect block (Operation 133).

If the block is not a defect block, the next operation is performed, and if the block is a defect block, it is examined whether the defect block has a replacement block (Operation 134).

If the certification result indicates that the defect block has a replacement block, defect status information indicating the defect block and the replacement block cannot be used is recorded on the disc (Operation 135). In other words, a defect list entry including defect status information indicating unusable blocks of a spare area for each of the replacement block and the defect block are recorded in the defect list.

If the certification result indicates that the defect block does not have a replacement block, defect status information indicating the defect block cannot be used is recorded on the disc (Operation 136). As previously described, a defect list entry including defect status information indicating an unusable block of the spare area for the defect block is recorded in the defect list.

Next, referring to FIG. 13B, in operation 137, it is examined whether the block within the newly allocated or enlarged spare area has a possibility of a defect.

If it is determined that the block does not have a possibility of a defect, operation Ⓑ is performed.

When the block has a possibility of a defect, it is determined whether to examine the block in the actual physical address (Operation 138). In other words, it is determined whether to examine the possible defective block according to a rule.

When a rule that does not require a possible defective block to be examined is set, defect status information indicating a replacement block that can or cannot be used according to a selection of a drive manufacturer or a user is written on the disc (Operation 143).

When a rule that registers defect status information according to the certification results of a possible defective block is set, the possible defective block in the actual physical address is examined (Operation 139).

After determining whether a defect is found from the certification result (Operation 140), if it is determined that there is a defect, a defect list entry including defect status information indicating an unusable replacement block is written on the disc (Operation 141).

If a defect is not found from the certification result, a defect list entry including defect status information indicating a usable replacement block is written on the disc (Operation 142).

Next, referring to FIG. 13C, the method moves to operation 144.

Whether the block within the enlarged or newly allocated spare area has defect status information (i.e., whether the block within the enlarged or newly allocated spare area has a defect list entry) is checked. If the block does not have the defect list entry, a defect list entry including defect status information indicating a usable replacement block is written on the disc (Operation 144).

Figure 14:
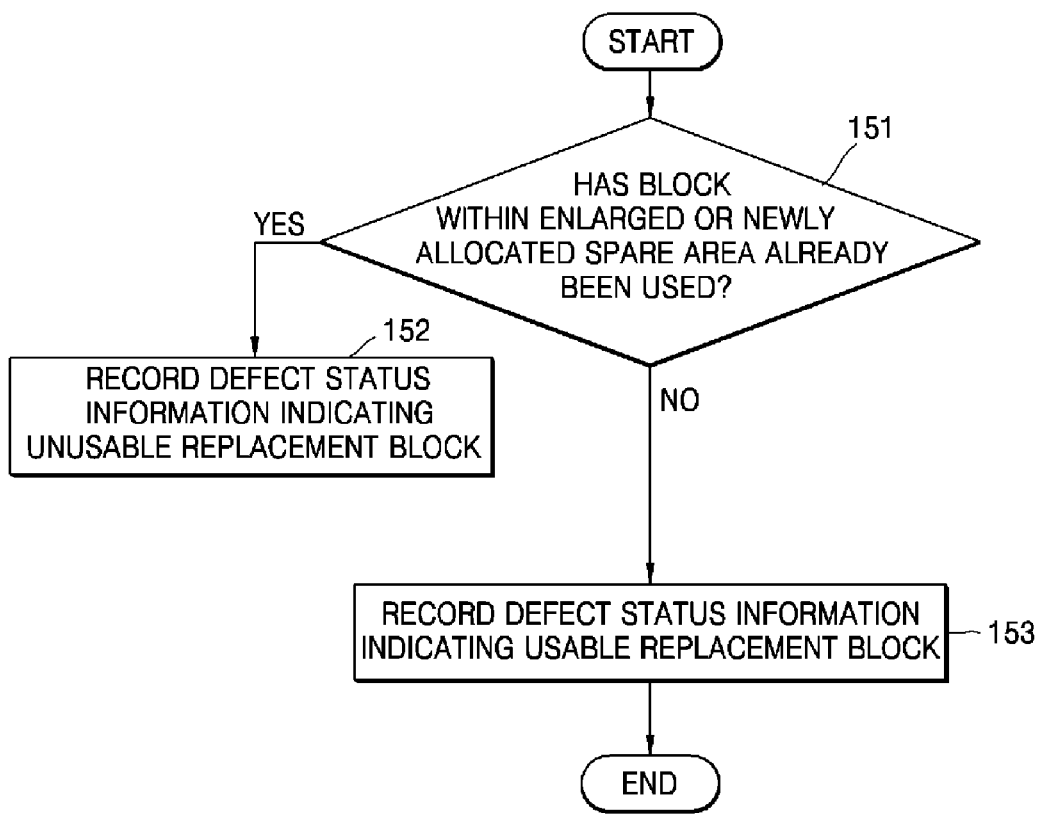
FIG. 14 is a flowchart illustrating a method of defect management in a write-once recording storage medium according to an embodiment of the present invention.

FIG. 14 is a flowchart illustrating a method of defect management in a write-once recording storage medium according to an embodiment of the present invention.

Referring to FIG. 14, it is determined whether a block within an enlarged or newly allocated spare area is already used (Operation 151).

If the certification result indicates that the block has been already used, a defect list entry including defect status information indicating an unusable replacement block is written on the disc (Operation 152).

If the certification result indicates that the block has not yet been used, a defect list entry including defect status information indicating a usable replacement block is written on the disc (Operation 153).

A method of processing a defect list entry according to another embodiment of the present invention will be described with reference to FIGS. 15 through 19.

Figure 15A:
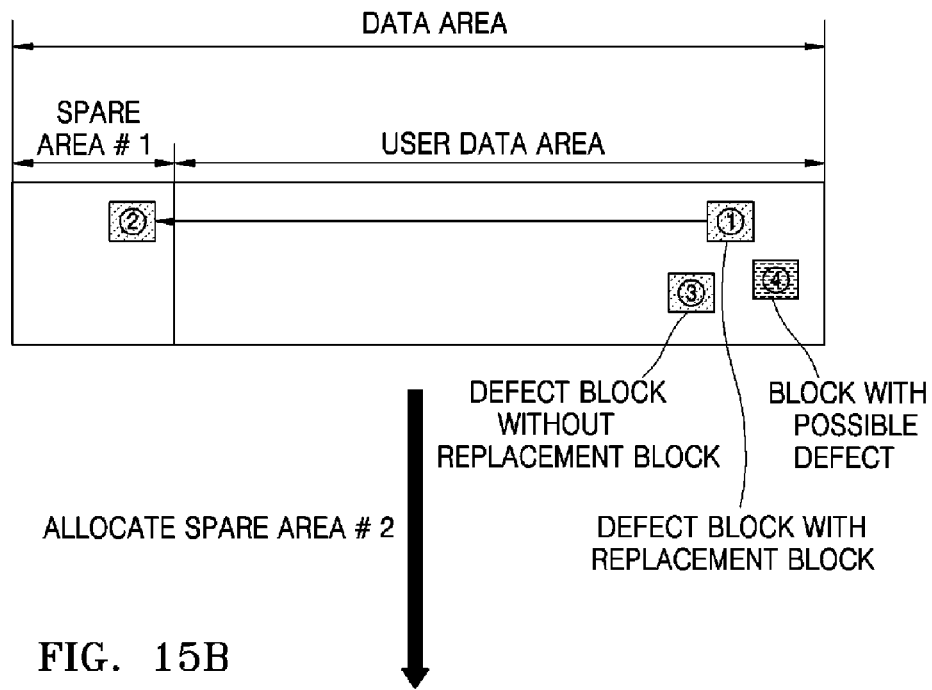
FIGS. 15A and 15B are reference diagrams for describing a method of processing a defect list entry of a block within a newly allocated spare area according to an embodiment of the present invention.
Figure 15B:
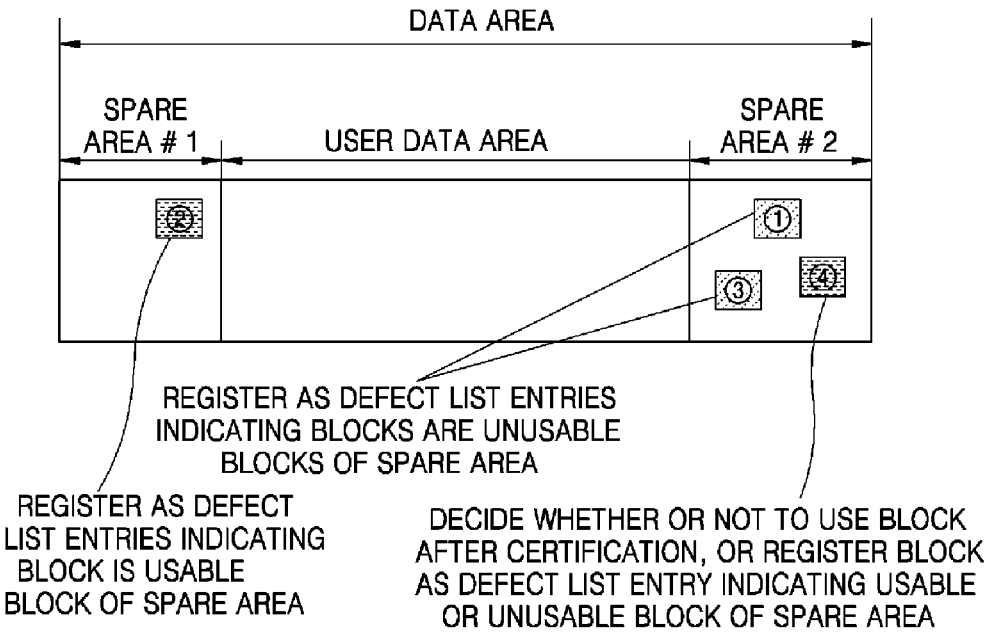

FIGS. 15A and 15B are reference diagrams describing a method of processing a defect list entry of a block within a newly allocated spare area according to the other embodiment.

FIG. 15A is a view illustrating a status of a data block in a single recording layer disc in which only a spare area # 1 is allocated and used at the initialization, and FIG. 15B is a view illustrating processed status information of blocks included in a spare area # 2 in the disc, which has the spare area # 2 allocated therein while using the disc.

FIG. 15A is identical to FIG. 9A, and FIG. 15B is similar to FIG. 9B except for a replacement block ② that is located in the spare area # 1.

Referring to FIG. 15B, a defect list entry indicating the block ① in the spare area # 2 is an unusable block of a spare area and a defect list entry indicating the block ③ in the spare area # 2 is an unusable block of the spare area are registered, respectively, and a defect list entry indicating a block ② in the spare area # 1 is a usable block of the spare area is registered. That is, the blocks ① and ③ are indicated as unusable blocks because they are defect blocks with defects, but the block ② is indicated as a usable block since it does not have a defect therein.

In the present embodiment, after the spare area # 2 is newly allocated, the replacement block ② in the spare area # 1 is registered as the defect list entry indicating it is the unusable block of the spare area in consideration of the usage direction of the spare area. However, in the present embodiment, the replacement block ② may also be registered as a defect list entry indicating it is a usable block of the spare area in order to use the disc without wasting any space of the spare area by using blocks that are usable because there is no defect in them even if the order of blocks does not coincide with the usage direction of the spare area.

Figure 16A:
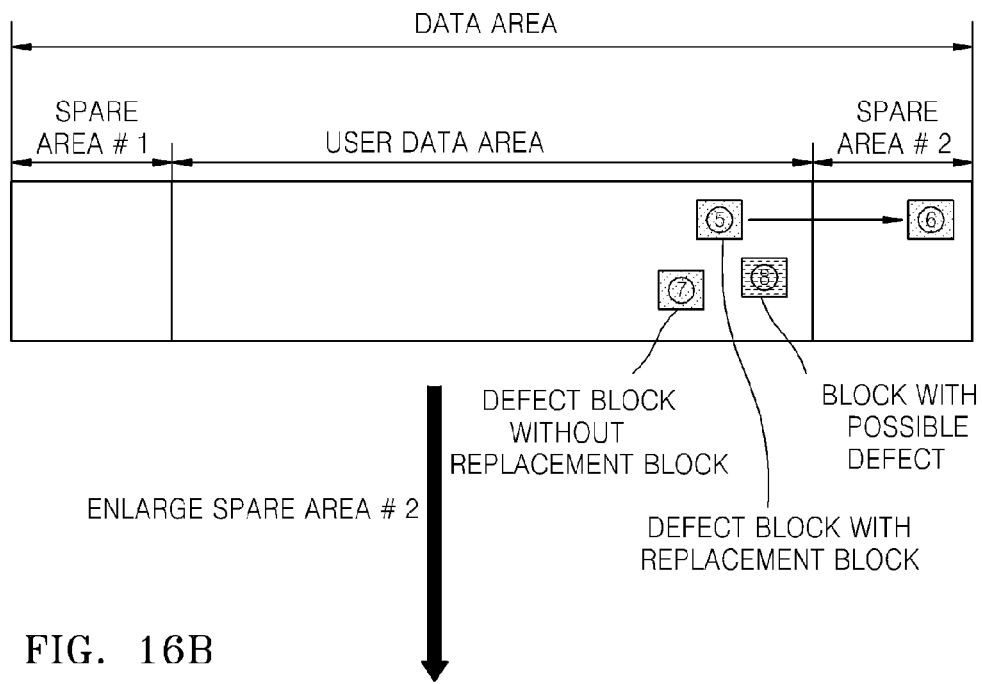
FIGS. 16A and 16B are reference diagrams for describing a method of processing a defect list entry of a block within an enlarged spare area according to an embodiment of the present invention.
Figure 16B:
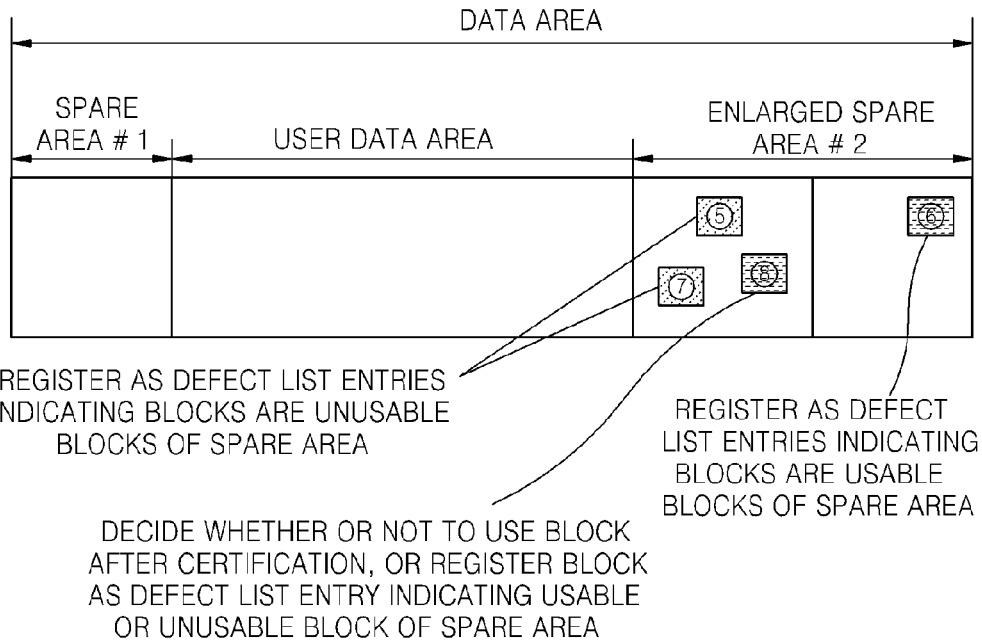

FIGS. 16A and 16B are reference diagrams for describing a method of processing a defect list entry of a block within an enlarged spare area according to another embodiment of the present invention.

FIG. 16A is a view illustrating a status of a data block in a single recording layer disc in which spare areas # 1 and # 2 are allocated and used at the initialization, and FIG. 16B is a view illustrating processed status information of blocks included in an enlarged spare area # 2 when the spare area # 2 needs to be enlarged while using the disc.

FIG. 16A is identical to FIG. 10A, and FIG. 16B is similar to FIG. 10B except for the replacement block ⑥.

Referring to FIG. 16B, a defect list entry indicating the block ⑤ in the spare area # 2 is an unusable block of a spare area and a defect list entry indicating the block ⑦ in the spare area # 2 is an unusable block of the spare area are registered, respectively, and a defect list entry indicating a block ⑥ in the spare area # 2 before being enlarged is a usable block of the spare area is registered. That is, the blocks ⑤ and ⑦ are indicated as unusable blocks because they have defects, but the block ⑥ is indicated as a usable block because it does not have a defect therein.

In the present embodiment, after the spare area # 2 was enlarged, the replacement block ⑥ was registered as a defect list entry indicating it is an unusable block of a spare area in consideration of the usage direction of the spare area. But, in the present embodiment, the replacement block ② may also be registered as a defect list entry indicating it is a usable block of the spare area. Accordingly, the disc can be used without wasting any space of the spare area by using blocks that are usable because there is no defect in them even if the blocks do not coincide with the usage direction of the spare area.

FIGS. 17A and 17B are reference diagrams for describing changing of the list entry of the blocks within the newly allocated or enlarged spare area according to the other embodiment of the present invention.

FIGS. 17A and 17B illustrate a changed state of defect list entries in situations illustrated in FIGS. 15A through 16B. A defect list entry before enlarging or newly allocating a spare area illustrated in 17A is the defect list entry indicating the status information of the blocks before enlarging or newly allocating the spare area illustrated in FIG. 15A or 16A. A defect list entry after enlarging or newly allocating blocks illustrated in FIG. 17B is the defect list entry indicating the status information of the blocks after enlarging or newly allocating the spare area illustrated in FIG. 15B or 16B.

The situations illustrated in FIGS. 17A and 17B are similar to those illustrated in FIGS. 11A and 11B according to an embodiment of the present embodiment except for the replacement block ②, which can be seen that the status information of the replacement block ② changes according to an embodiment of the present embodiment.

An aspect of the present embodiment is to make replacement blocks of a spare area become usable blocks in a newly allocated or enlarged spare area. Referring to FIG. 17B, status information of a replacement block ② is registered as "4."

That is, status information indicating the replacement block ②is a usable block is contained in a defect list entry of the replacement block ②.

Figure 18:
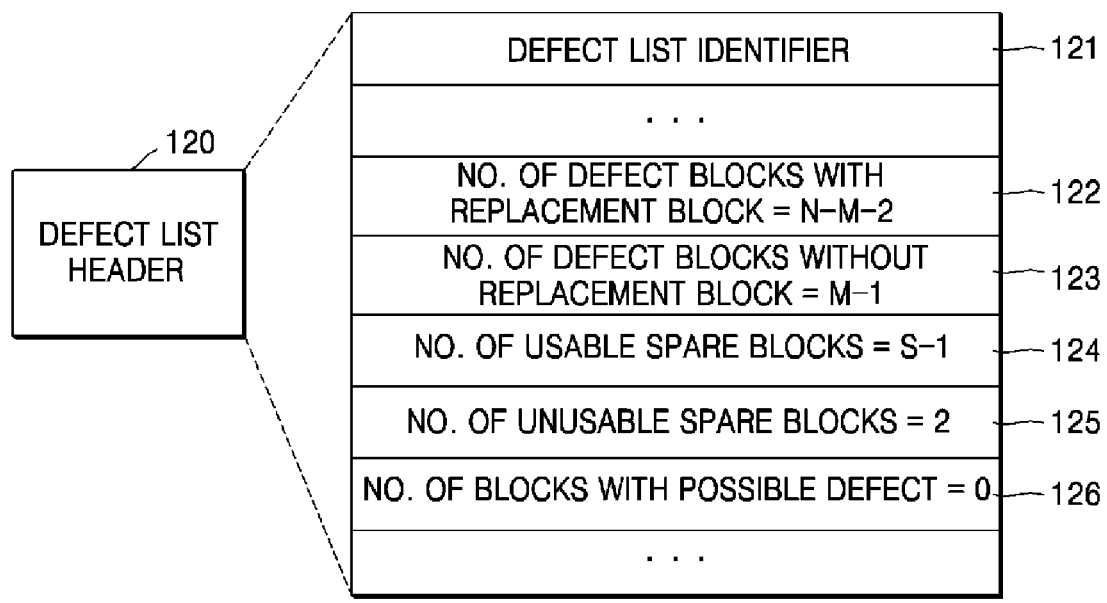
FIG. 18 is a view of a status of data of a defect list header right after enlarging or allocating the spare area according to an embodiment of the present invention.

FIG. 18 is a view of a status of data of a defect list header right after enlarging or newly allocating the spare area according to the other embodiment of the present invention. That is, an update of the defect list header 120 right after enlarging or newly allocating the spare area is illustrated in FIG. 18 according to an embodiment of the present invention.

Referring to FIG. 18, which is similar to that of FIG. 12B, it can be seen that only the number of usable spare blocks 124 and the number of unusable spare area blocks 125 illustrated in FIG. 12B are different from the number of usable spare blocks 124 and the number of unusable spare area blocks 125 illustrated in FIG. 18B. That is, in the present embodiment, the blocks that cannot use the replacement block ② were indicated, but in the present embodiment, blocks that can use the replacement block ② are indicated. Thus, only parts related to this change are altered. In more detail, the number of usable spare blocks 124 increases by one compared to that of FIG. 12B and thus S−1 is registered, and the number of unusable spare area blocks 125 decreases by one compared to that of FIG. 12B and thus "2" is registered.

Figure 19:
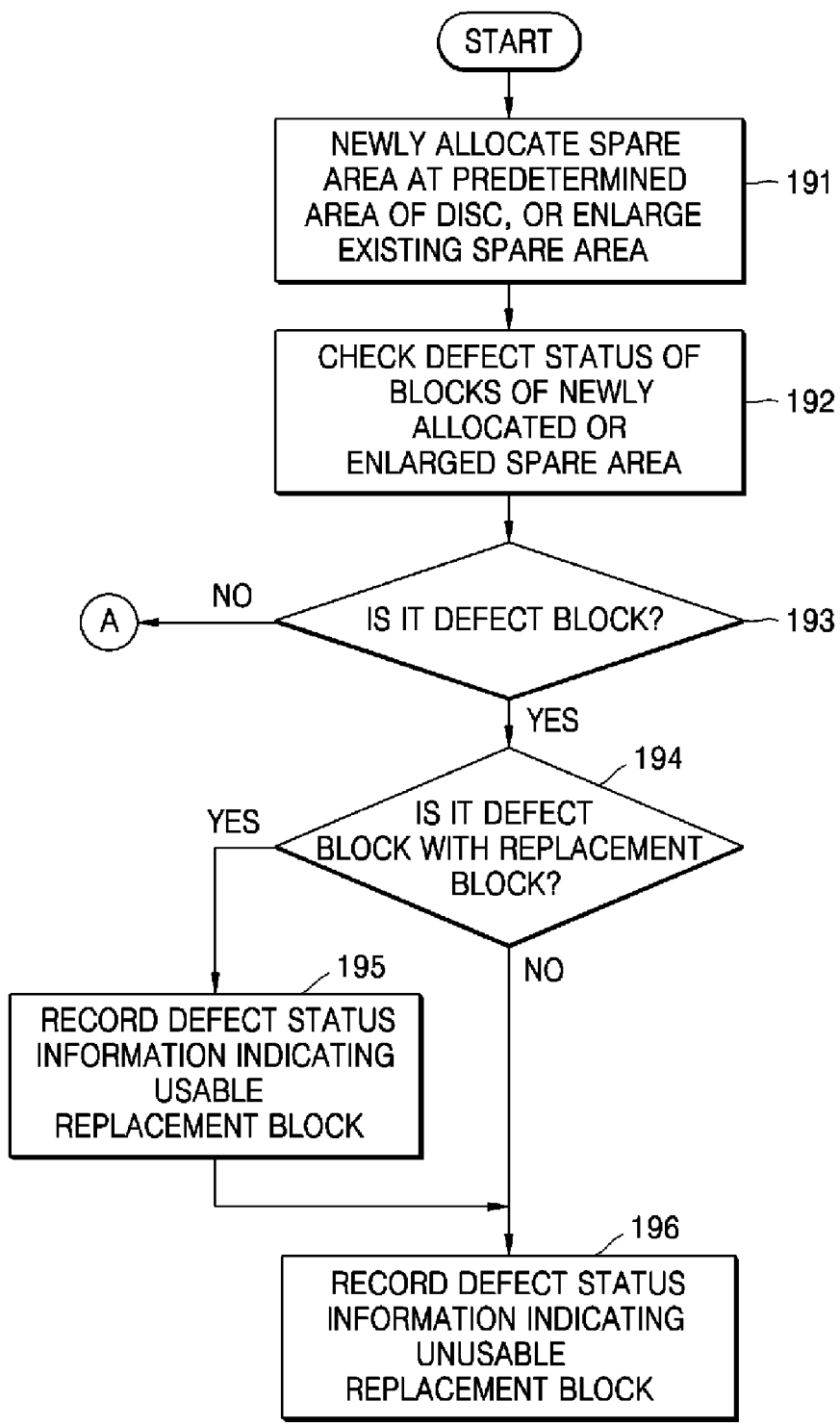
FIG. 19 is a flowchart illustrating a method of defect management according to an embodiment of the present invention.

FIG. 19 is a flowchart illustrating a method of defect management according to the other embodiment of the present invention. Compared to FIG. 13A only the part which processes a replacement block that replaces defect blocks in a newly allocated or enlarged spare area is different.

Referring to FIG. 19, first, a spare area is newly allocated to a predetermined area of a disc or the existing spare area is enlarged (Operation 191). That is, when all of the spare area existing in the disc is used up or there is not much space left in the spare area, a new spare area is allocated or the spare area is enlarged.

Then, a defect status of blocks existing in the newly allocated or enlarged spare area is checked (Operation 192). That is, by managing the defect status of the blocks in the newly allocated or enlarged spare area, blocks with a defect or a high possibility of a defect occurrence within the spare area are not used again.

Thereafter, it is examined whether the block within the newly allocated or enlarged spare area is a defect block (Operation 193).

If the block is not a defect block, the next operation is performed, and if the block is a defect block, it is examined whether the defect block has a replacement block (Operation 194).

If the certification result indicates that the defect block does not have a replacement block, defect status information indicating the defect block is an unusable replacement block is recorded on the disc (Operation 196). In other words, a defect list entry including defect status information indicating an unusable block of the spare area for the defect block is recorded in the defect list.

If the certification result indicates that the defect block has a replacement block, defect status information indicating the replacement block is a usable replacement block is recorded on the disc (Operation 195). Then, regarding the defect block, defect status information indicating the defect block is an unusable replacement block is recorded on the disc (Operation 196).

In the embodiments of the present invention, it was decided that the defect blocks or the replacement blocks in the newly allocated or enlarged spare area. However, the deciding of the usable or unusable blocks of the spare area can be changed according to a variety of rules of the drive system or the manufacturer if the blocks satisfy Equation 1. Another embodiment according to the present invention considers this situation.

That is, in order to satisfy Equation 1, when a defect list requires an update due to enlarging the spare area or allocating a new spare area while using the disc, a defect list entry indicating the defect block or the replacement block is a usable block for replacement or a defect list entry indicating the defect block or the replacement block is an unusable block for replacement is registered regarding the defect block and the replacement block within the enlarged or newly allocated spare area while using the disc.

That is, when a physical address of a defect block with a replacement block is located within the enlarged or the newly allocated spare area, a defect list entry indicating the defect block is a usable or unusable block for replacement is registered. Also, a defect list entry indicating that the defect block is a usable or unusable block for replacement is registered.

When a physical address of a defect block without a replacement block is located within the enlarged or the newly allocated spare area, a defect list entry indicating that the defect block is a usable or unusable for replacement is registered.

When a physical address of a possible defective block is located within the enlarged or the newly allocated spare area, a defect list entry indicating that the defect block is a usable or unusable for replacement is registered.

Figure 20A:
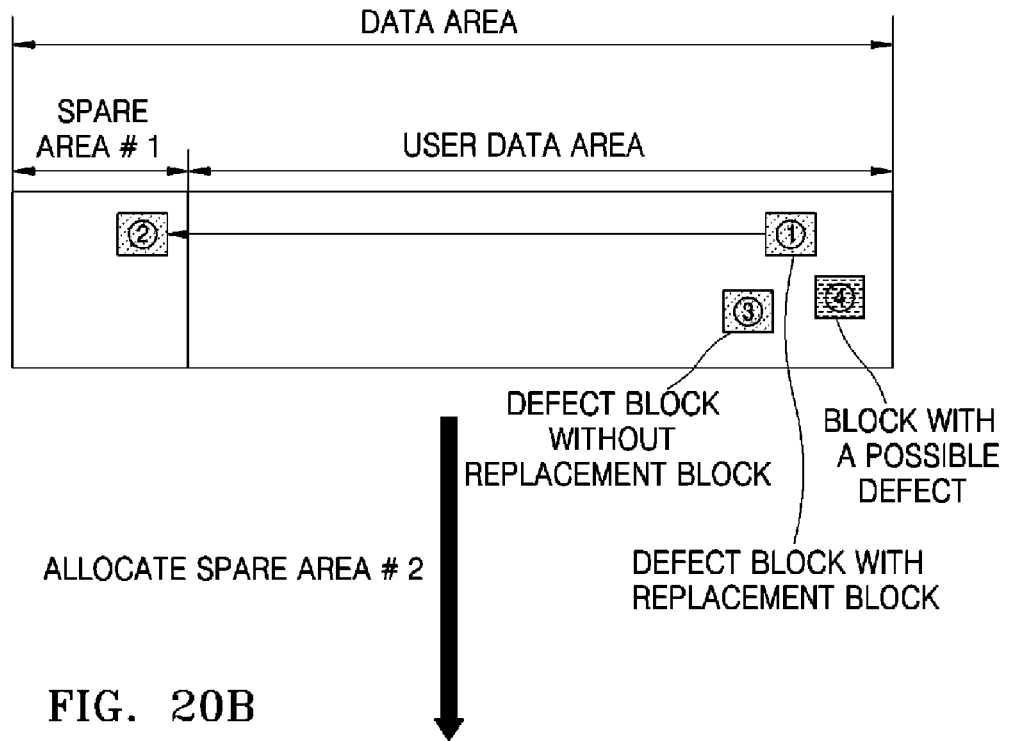
FIGS. 20A and 20B are reference diagrams for describing a method of processing a defect list entry of a block within a newly allocated spare area according to an embodiment of the present invention.
Figure 20B:
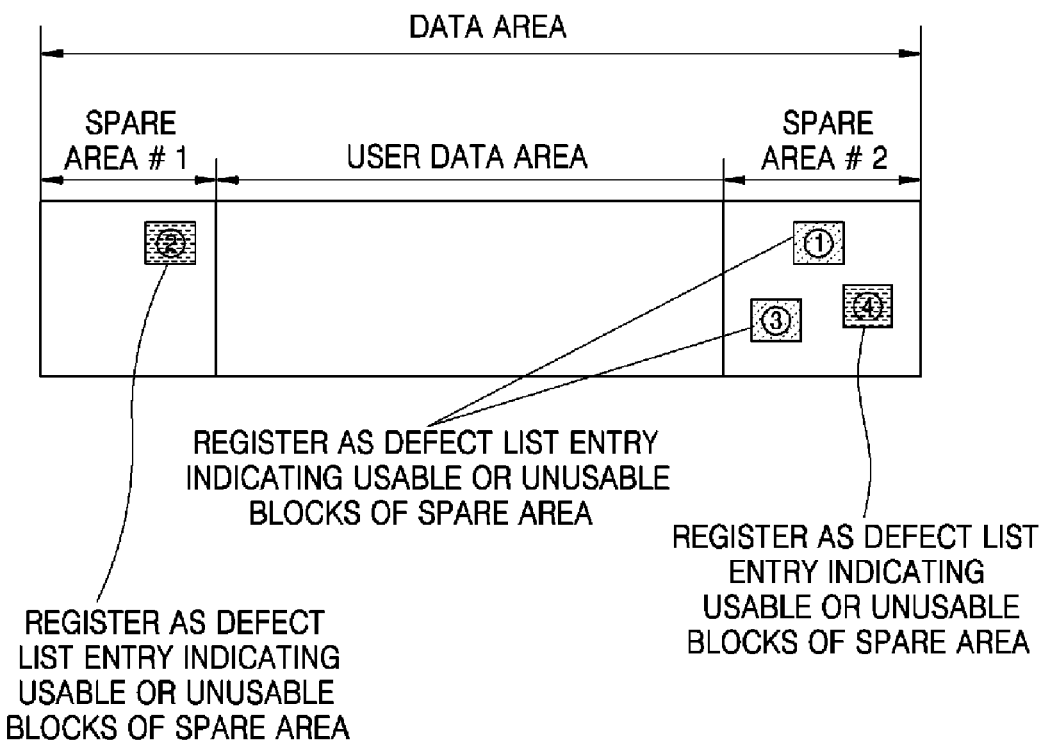

FIGS. 20A and 20B are reference diagrams describing a method of processing a defect list entry of a block within a newly allocated spare area according to another embodiment of the present invention.

FIG. 20A is a view illustrating a status of a data block in a single recording layer disc in which only a spare area # 1 is allocated and used at the initialization. FIG. 20B is a view illustrating processed status information of blocks included in a spare area # 2 in the disc, which has the spare area # 2 allocated therein while using the disc.

FIG. 20A is the same as FIG. 15A.

Referring to FIG. 20B, in order to make all blocks, a block ② in the spare area # 1 and blocks ①, ③, and ④ in the spare area # 2, usable or unusable according to a predetermined rule, all the blocks are registered as a defect list entry indicating they are usable or unusable blocks of a spare area.

Figure 21:
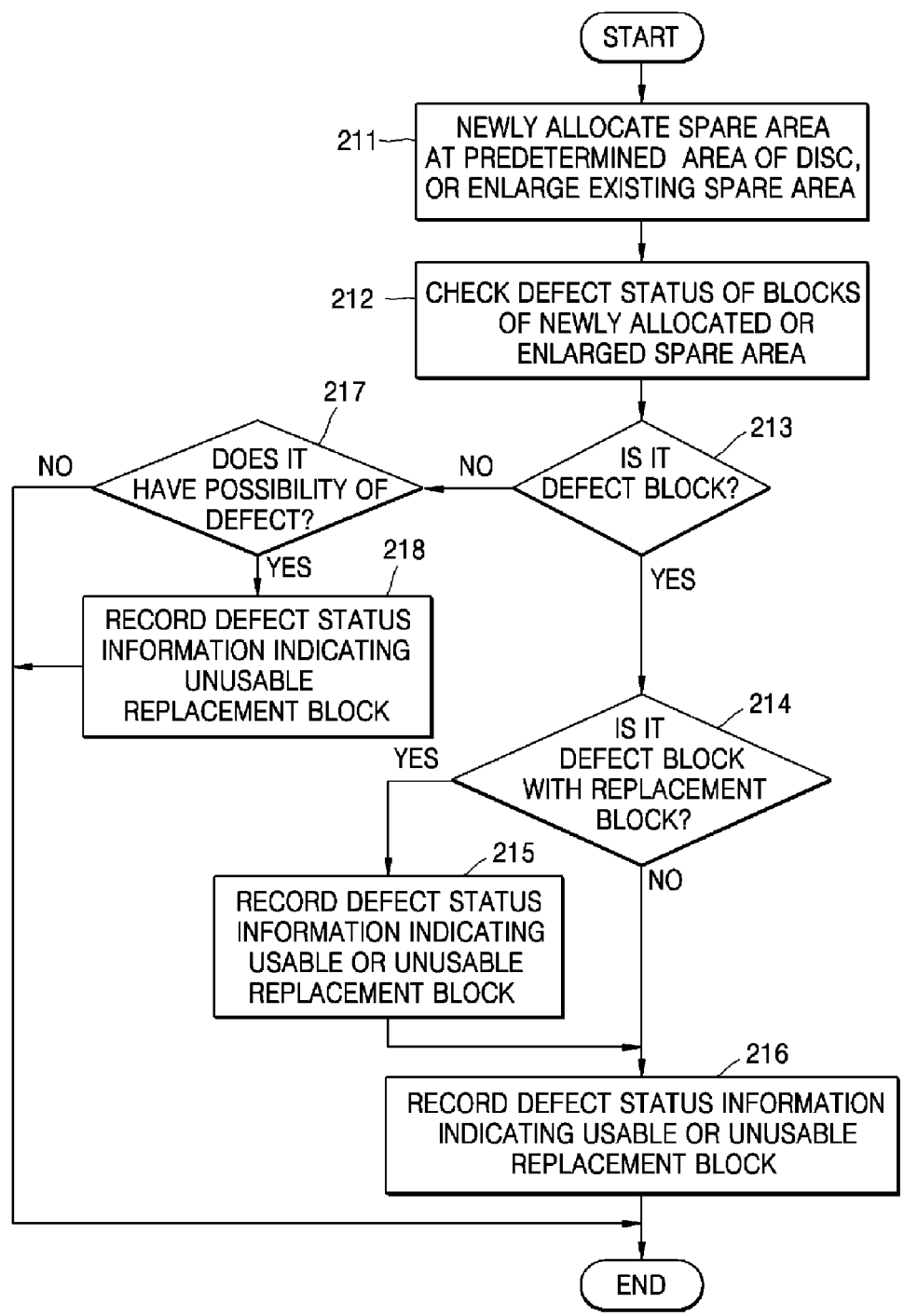
FIG. 21 is a flowchart illustrating a method of defect management for a recordable optical recording medium according to an embodiment of the present invention.

FIG. 21 is a flowchart illustrating a method of defect management of recordable optical recording medium according to the other embodiment of the present invention.

Referring to FIG. 21, first, a spare area is newly allocated to a predetermined area of a disc or the existing spare area is enlarged (Operation 211). That is, when all of the spare area existing in the disc is used up or there is not much space left in the spare area, a new spare area is allocated or the spare area is enlarged.

Then, a defect status of blocks existing in the newly allocated or enlarged spare area is checked (Operation 212). That is, by managing the defect status of the blocks in the newly allocated or enlarged spare area, blocks with a defect or a high possibility of a defect occurrence within the spare area are not used again.

Thereafter, it is examined whether the block within the newly allocated or enlarged spare area is a defect block (Operation 213).

If the block is a defect block, it is examined whether the defect block has a replacement block (Operation 214).

If the certification result indicates that the defect block does not have a replacement block, defect status information indicating that the defect block is a usable or unusable replacement block is recorded on the disc according to a predetermined rule (Operation 216). In other words, regarding the defect block, a defect list entry including defect status information indicating a usable or unusable block of the spare area according to the predetermined rule is recorded in a defect list.

If the certification result indicates that the defect block has a replacement block, defect status information indicating the replacement block is a usable or unusable block is recorded on the disc according to a predetermined rule (Operation 215). Then, regarding the defect block, defect status information indicating the defect block is a usable or unusable replacement block is recorded on the disc according to the predetermined rule (Operation 216).

If determined that the block with the newly allocated or enlarged spare area is a defect block, it is determined whether the block has a possibility of a defect in operation 217.

When determined that the block has a possibility of a defect, defect status information indicating that the block is a usable or unusable replacement block is recorded according to a predetermined rule (Operation 218).

FIG. 22 is a view of an exemplary method of processing a defect list entry for improving performance of a drive according to an embodiment of the present invention.

Referring to FIG. 22, when a defect block with a replacement block and/or a defect block without a replacement block and a possible defective block are within a user data area even after the spare area is enlarged or newly allocated, the current state is maintained without changing the defect list entry.

Also, because the spare area is enlarged or a new spare area is allocated, a replacement block in the spare area before enlarging the spare area or newly allocating a spare area cannot exist in the user data area after enlarging or newly allocating the spare area.

When a defect block with a replacement block before enlarging the spare area or newly allocating a spare area is included in the spare area after enlarging or newly allocating the spare area, it is preferable, but not necessary, to change a defect list entry into the defect list entry indicating that the defect block is an unusable replacement block.

In the case a replacement block is included in the spare area after enlarging or newly allocating the spare area, when a defect block corresponding to the replacement block is located in the spare area after the spare area is enlarged or newly allocated, it is preferable, but not necessary, to register a defect list entry indicating that the replacement block is a usable replacement block. This is preferable, but not necessary, since the replacement block can no longer actually act as a replacement block of the defect block, and this way, the replacement block can be used to replace another defect block.

In case a replacement block before enlarging the spare area or newly allocating the spare area is included in the spare area after enlarging or newly allocating the spare area, when a defect block corresponding to the replacement block is located in the user data area after the spare area is enlarged or newly allocated, it is preferable, but not necessary, that the defect list entry regarding the replacement block to remain in the same state as before enlarging or newly allocating the spare area. Since the defect block corresponding to the replacement block is located in the user data area after the spare area is enlarged or newly allocated, it is preferable, but not necessary, to maintain the defect list entry in the current state because the replacement block is an effective block which replaces the defect block.

When a defect block of a defect list entry without a replacement block before enlarging the spare area or newly allocating a spare area is included in the spare area after enlarging or newly allocating the spare area, it is preferable, but not necessary, to register a defect list entry indicating that the defect block is an unusable replacement block.

When a defect block of a defect list entry with a defect possibility before enlarging the spare area or newly allocating a spare area is included in the spare area after enlarging or newly allocating the spare area, it is preferable, but not necessary, to register a defect list entry indicating that the defect block is an unusable replacement block.

Up to now, a method of processing a defect list entry within an enlarged or newly allocated spare area in a rewritable information storage medium has been described. However, if the method is applied in a write-once information storage medium, all blocks already written in an enlarged or newly allocated spare area need to be registered as a defect list entry (status information "5") for unusable blocks of the spare area due to the characteristics of the write-once information storage medium that cannot be overwritten.

According to an aspect of the present invention, by managing defect status information of blocks in an enlarged or newly allocated spare area, unnecessary operations of a drive system may be prevented, and thus improving the efficiency of the drive system.

The method of defect management can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy discs, optical data storage devices, and carrier waves (such as data transmission through the Internet). The computer readable recording medium can also be distributed over network coupled computer systems so that the computer readable code is stored and executed in a distributed fashion. Also, functional programs, codes, and code segments for accomplishing the method of defect management can be easily construed by programmers skilled in the art to which the present invention pertains.

Although a few embodiments of the present invention have been shown and described, it would be appreciated by those skilled in the art that changes may be made in this embodiment without departing from the principles and spirit of the invention, the scope of which is defined in the claims and their equivalents. The embodiments should be considered in descriptive sense only and not for purposes of limitation. Therefore, the scope of the invention is defined not by the description of the invention but by the appended claims, and all differences within the scope will be construed as being included in the present invention.

What is claimed is:

1. A recording and/or reproducing apparatus to record or reproduce data on or from an information recording medium comprising a user data area and a spare area, the apparatus comprising:

a reading and/or writing unit to read the data from the information recording medium and/or write the data on the information recording medium; and a defect managing unit to generate a second defect list entry corresponding to a data block that was originally within the user data area, and was subsequently placed within the spare area due to an enlargement of an existing spare area or an allocation of a new spare area;

wherein the defect managing unit generates the second defect list entry by converting a first defect list entry corresponding to the data block to the second defect list entry;

the first defect list entry comprises status information indicating whether the data block has a corresponding replacement block for replacing the data block, and location information indicating a location of the data block within the user data area as defective block information; and the second defect list entry comprises status information indicating that the data block is an unusable block for replacing a defective block, and location information indicating a location of the data block as replacement block information, wherein the defect managing unit further generates a defect list header comprising a number of unusable spare blocks, the unusable spare blocks comprising the data block.

2. A non-transitory information recording medium for use with a recording and/or reproducing apparatus, the non-transitory information recording medium comprising:

a user data area;

a spare area;

a second defect list entry corresponding to a data block that was originally within the user data area, and was subsequently placed within the spare area due to an enlargement of an existing spare area or an allocation of a new spare area, the second defect list entry comprising:

status information indicating that the data block is an unusable block for replacing a defective block; and location information indicating a location of the data block as replacement block information; and a defect list header comprising a number of unusable spare blocks, the unusable spare blocks comprising the data block;

wherein the second defect list entry was generated after the data block was placed within the spare area by converting a first defect list entry for the data block that was generated while the data block was in the user data area, the first defect list entry having comprised:

status information that indicated whether the data block had a corresponding replacement block for replacing the data block; and location information that indicated a location of the data block within the user data area as defective block information.

3. A recording and/or reproducing apparatus to record or reproduce data on or from an information recording medium comprising a user data area and a spare area, the apparatus comprising:

a reading and/or writing unit to read the data from the information recording medium and/or write the data on the information recording medium; and a control unit to control the reading and/or writing unit to reproduce a defect list comprising a second defect list entry corresponding to a data block that was originally within the user data area, and was subsequently placed within the spare area due to an enlargement of an existing spare area or an allocation of a new spare area;

wherein the second defect list entry was generated by converting a first defect list entry corresponding to the data block to the second defect list entry;

the first defect list entry comprises status information indicating whether the data block has a corresponding replacement block for replacing the data block, and location information indicating a location of the data block within the user data area as defective block information; and the second defect list entry comprises status information indicating that the data block is an unusable block for replacing a defective block, and location information indicating a location of the data block as replacement block information, wherein the defect list comprises a defect list header comprising a number of unusable spare blocks, the unusable spare blocks comprising the data block.

4. A method of managing a defect on an information recording medium comprising a user data area and a spare area, the method comprising:

generating a defect list comprising a second defect list entry corresponding to a data block that was originally within the user data area, and was subsequently placed within the spare area due to an enlargement of an existing spare area or an allocation of a new spare area;

wherein the generating of the defect list comprises generating the second defect list entry by converting a first defect list entry corresponding to the data block to the second defect list entry;

the first defect list entry comprises status information indicating whether the data block has a corresponding replacement block for replacing the data block, and location information of the data block within the user data area as defective block information; and the second defect list entry comprises status information indicating that the data block is an unusable block for replacing a defective block, and location information of the data block as replacement block information, wherein the defect list comprises a defect list header comprising a number of unusable spare blocks, the unusable spare blocks comprising the data block.

* * * * *